(12) United States Patent
Kim et al.

(10) Patent No.: US 11,522,639 B2
(45) Date of Patent: Dec. 6, 2022

(54) MOBILE COMMUNICATION METHOD USING AI

(71) Applicant: LG ELECTRONICS INC., Seoul (KR)

(72) Inventors: Sunam Kim, Seoul (KR); Ilhwan Kim, Seoul (KR); Jongku Lee, Seoul (KR); Ikjoo Jung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 127 days.

(21) Appl. No.: 17/035,953

(22) Filed: Sep. 29, 2020

(65) Prior Publication Data

US 2021/0297178 A1   Sep. 23, 2021

(30) Foreign Application Priority Data

Mar. 19, 2020   (KR) ........................ 10-2020-0034034

(51) Int. Cl.
| | |
|---|---|
| *H04L 1/00* | (2006.01) |
| *H04L 1/18* | (2006.01) |
| *H04B 7/06* | (2006.01) |
| *G06N 3/02* | (2006.01) |
| *H04L 5/00* | (2006.01) |

(52) U.S. Cl.
CPC ............. *H04L 1/0041* (2013.01); *G06N 3/02* (2013.01); *H04B 7/0626* (2013.01); *H04L 1/1812* (2013.01); *H04L 5/0055* (2013.01)

(58) Field of Classification Search
CPC ...... G06N 3/02; G06N 3/0445; G06N 3/0454; H04B 7/0626; H04B 7/0628; H04B 7/0695; H04L 1/0026; H04L 1/0041; H04L 1/1812; H04L 1/1825; H04L 5/0055

See application file for complete search history.

(56) References Cited

U.S. PATENT DOCUMENTS

| | | | |
|---|---|---|---|
| 10,673,546 B2* | 6/2020 | Bedekar | H04L 5/0057 |
| 2007/0135130 A1* | 6/2007 | Lee | H04W 72/1289 |
| | | | 455/450 |
| 2015/0109998 A1* | 4/2015 | Yang | H04L 1/1896 |
| | | | 370/328 |
| 2019/0363880 A1* | 11/2019 | Lee | G06F 15/7807 |
| 2020/0126185 A1* | 4/2020 | Choi | G06N 3/02 |

(Continued)

*Primary Examiner* — Hassan A Phillips
*Assistant Examiner* — Hicham B Foud
(74) *Attorney, Agent, or Firm* — Birch, Stewart, Kolasch & Birch, LLP

(57) ABSTRACT

Provided is a method for transmitting or receiving data, by a user equipment (UE), to or from a base station (BS). The method includes transmitting, by the UE, capability information of the UE to the BS, wherein the capability information includes information related to artificial intelligence (AI) calculation for the data transmission or reception, receiving, by the UE, at least one of a plurality of AI parameters from the BS, and applying the at least one AI parameter to an encoding process for the data transmission or a decoding process for the data reception, wherein the encoding process or the decoding process is performed by information on a network structure in the at least one AI parameter, and wherein the at least one AI parameter comprises a plurality of information for performing the encoding process or the decoding process by the network structure.

10 Claims, 25 Drawing Sheets

(56) References Cited

U.S. PATENT DOCUMENTS

| | | | |
|---|---|---|---|
| 2020/0126187 A1* | 4/2020 | Park | H04N 21/251 |
| 2020/0366537 A1* | 11/2020 | Wang | H04L 25/0224 |
| 2021/0160149 A1* | 5/2021 | Ma | H04L 41/0816 |
| 2021/0185700 A1* | 6/2021 | Pezeshki | G06N 5/04 |
| 2021/0194548 A1* | 6/2021 | Pezeshki | H04B 7/0473 |
| 2021/0195462 A1* | 6/2021 | Pezeshki | H04B 7/0626 |
| 2021/0351863 A1* | 11/2021 | Gunduz | H04L 1/0009 |

* cited by examiner

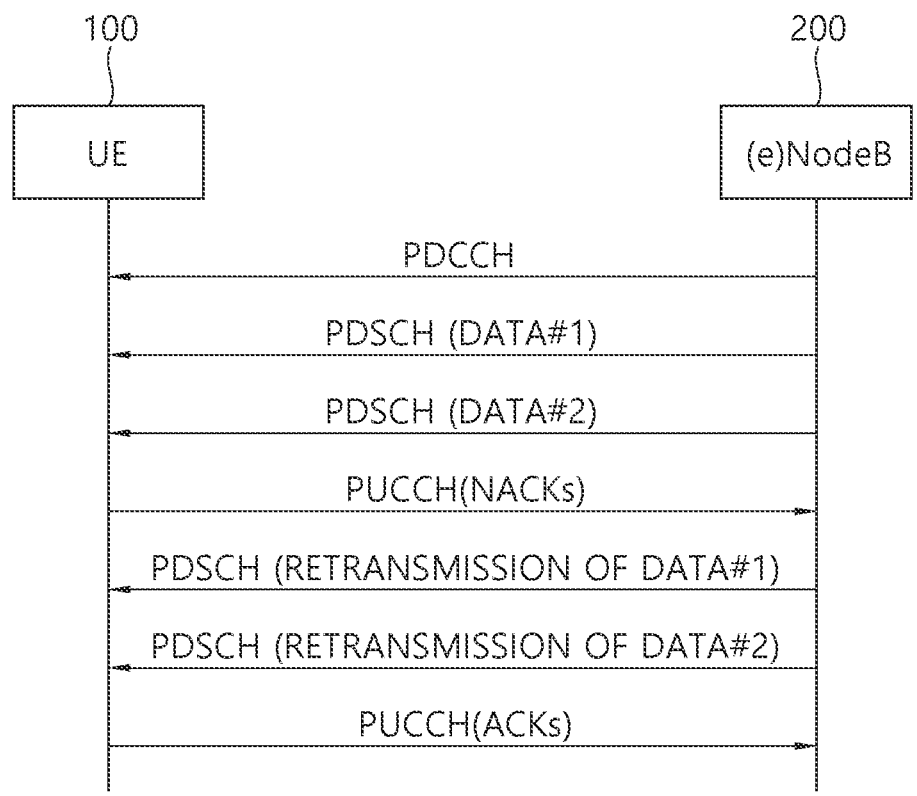

MOBILE COMMUNICATION METHOD USING AI

Cross Reference to Related Applications

This non-provisional application claims the benefit under 35 U.S.C. § 119(a) to Patent Application No. 10-2020-0034034, filed in the Republic of Korea on Mar. 19, 2020, which is hereby expressly incorporated by reference into the present application.

BACKGROUND OF THE DISCLOSURE

Field of the Disclosure

The present disclosure relates to mobile communication.

Related Art

FIG. 1 illustrates a wireless communication system.

As seen with reference to FIG. 1, the wireless communication system includes at least one base station (BS) 20. Each base station 20 provides a communication service to specific geographical areas (generally, referred to as cells) 20a, 20b, and 20c. The cell may be further divided into a plurality of areas (sectors).

The UE generally belongs to one cell and the cell to which the UE belong is referred to as a serving cell. A base station that provides the communication service to the serving cell is referred to as a serving BS. Since the wireless communication system is a cellular system, another cell that neighbors to the serving cell is present. Another cell which neighbors to the serving cell is referred to a neighbor cell. A base station that provides the communication service to the neighbor cell is referred to as a neighbor BS. The serving cell and the neighbor cell are relatively decided based on the UE.

Hereinafter, a downlink means communication from the base station 20 to the UE 10 and an uplink means communication from the UE 10 to the base station 20. In the downlink, a transmitter may be a part of the base station 20 and a receiver may be a part of the UE 10. In the uplink, the transmitter may be a part of the UE 10 and the receiver may be a part of the base station 20.

Meanwhile, the wireless communication system may be generally divided into a frequency division duplex (FDD) type and a time division duplex (TDD) type. According to the FDD type, uplink transmission and downlink transmission are achieved while occupying different frequency bands. According to the TDD type, the uplink transmission and the downlink transmission are achieved at different time while occupying the same frequency band. A channel response of the TDD type is substantially reciprocal. This means that a downlink channel response and an uplink channel response are approximately the same as each other in a given frequency area. Accordingly, in the TDD based wireless communication system, the downlink channel response may be acquired from the uplink channel response. In the TDD type, since an entire frequency band is time-divided in the uplink transmission and the downlink transmission, the downlink transmission by the base station and the uplink transmission by the terminal may not be performed simultaneously. In the TDD system in which the uplink transmission and the downlink transmission are divided by the unit of a subframe, the uplink transmission and the downlink transmission are performed in different subframes.

Hereinafter, the LTE system will be described in detail.

FIG. 2 shows a downlink radio frame structure according to FDD of 3rd generation partnership project (3GPP) long term evolution (LTE).

The radio frame includes 10 sub-frames indexed 0 to 9. One sub-frame includes two consecutive slots. Accordingly, the radio frame includes 20 slots. The time taken for one sub-frame to be transmitted is denoted TTI (transmission time interval). For example, the length of one sub-frame may be 1ms, and the length of one slot may be 0.5 ms.

The structure of the radio frame is for exemplary purposes only, and thus the number of sub-frames included in the radio frame or the number of slots included in the sub-frame may change variously.

One slot includes $N_{RB}$ resource blocks (RBs) in the frequency domain. For example, in the LTE system, the number of resource blocks (RBs), i.e., $N_{RB}$, may be one from 6 to 110.

The resource block is a unit of resource allocation and includes a plurality of sub-carriers in the frequency domain. For example, if one slot includes seven OFDM symbols in the time domain and the resource block includes 12 sub-carriers in the frequency domain, one resource block may include 7×12 resource elements (REs).

The physical channels in 3GPP LTE may be classified into data channels such as PDSCH (physical downlink shared channel) and PUSCH (physical uplink shared channel) and control channels such as PDCCH (physical downlink control channel), PCFICH (physical control format indicator channel), PHICH (physical hybrid-ARQ indicator channel) and PUCCH (physical uplink control channel).

The uplink channels include a PUSCH, a PUCCH, an SRS (Sounding Reference Signal), and a PRACH (physical random access channel).

FIG. 3 is a flowchart showing an initial access process.

The UE 100, when just turned on, performs an initial cell selection process. First, the UE 100 receives synchronization signals, i.e., a primary synch signal (PSS) and a secondary synch signal (SSS), from an eNodeB 200-1 and a NodeB 200-2 and identifies cells by obtaining cell IDs through the synchronization signals.

Next, the UE 100 performs cell measurement through a reference signal, e.g., a synchronization signal (SS) or channel status information reference signal (CSI-RS). For the convenience of understanding, the SS will be described as follows. The SS is a reference signal shared by all UEs in a cell and is used for acquiring synchronization, measuring handover, and the like. The UE measures reference signal received power (RSRP) and reference signal received quality (RSRQ) by measuring the SS. In addition, the UE may calculate feedback information such as channel quality information (CQI), precoding matrix indicator (PMI), and rank indicator (RI) through the CRS-RS.

In addition, the UE 100 performs cell selection according to the contents described above. If the UE 100 selects the eNodeB 200-1, the eNodeB 200-1 becomes a serving cell.

The UE 100 receives system information, e.g., a master information block (MIB) and a system information block (SIB), from the eNodeB 200-1. The MIB may be received through a physical broadcast channel (PBCH) and the SIB may be received through a physical downlink shared channel (PDSCH).

If the UE 100 selects the eNodeB 200-1, the UE 100 camps on the cell of the eNodeB 200-1 and establishes an RRC connection.

SUMMARY OF THE DISCLOSURE

Accordingly, a disclosure of the present specification has been made in an effort to solve the aforementioned problem.

In an aspect, a method for transmitting or receiving data, by a user equipment (UE), to or from a base station (BS) is provided. The method includes: transmitting, by the UE, capability information of the UE to the BS, wherein the capability information may include information related to artificial intelligence (AI) calculation for the data transmission or reception.

The method may further include: receiving, by the UE, at least one AI parameter among a plurality of AI parameter sets (i.e., at least one of a plurality of AI parameters) from the BS; and applying the at least one AI parameter to an encoding process for the data transmission or a decoding process for the data reception.

The encoding process or the decoding process may be performed by information on a network structure in the at least one AI parameter, and the at least one AI parameter may include a plurality of information for performing the encoding process or the decoding process by the network structure.

BRIEF DESCRIPTION OF THE DRAWINGS

FIG. 4 is an exemplary view showing an operation of HARQ between a base station (BS) and a user equipment (UE).

DESCRIPTION OF EXEMPLARY EMBODIMENTS

Figure 1:
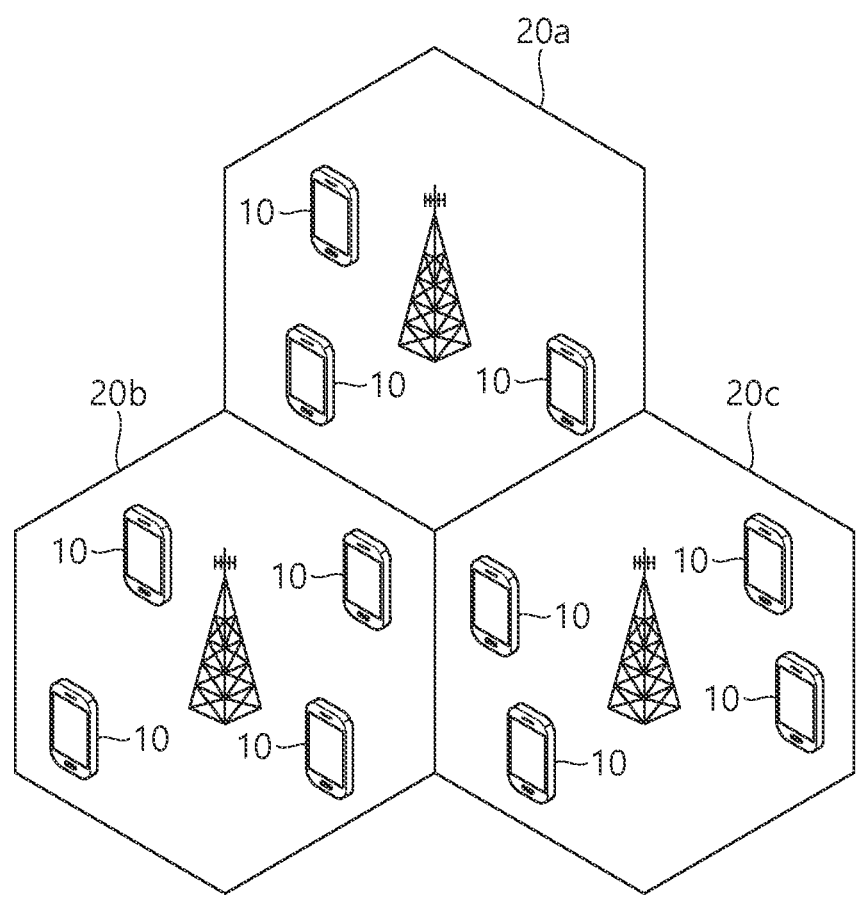
FIG. 1 illustrates a wireless communication system.
Figure 2:
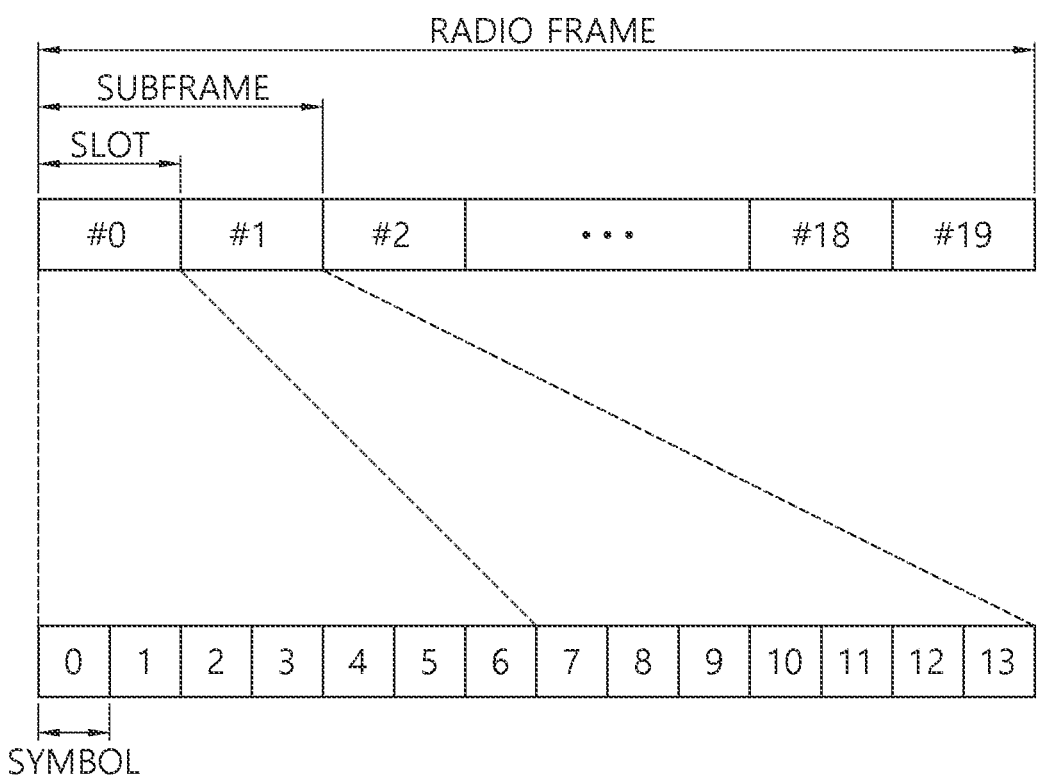
FIG. 2 shows the structure of a radio frame according to FDD in 3GPP LTE.

The technical terms used herein are used to merely describe specific embodiments and should not be construed as limiting the present disclosure. Further, the technical terms used herein should be, unless defined otherwise, interpreted as having meanings generally understood by those skilled in the art but not too broadly or too narrowly. Further, the technical terms used herein, which are determined not to exactly represent the spirit of the specification, should be replaced by or understood by such technical terms as being able to be exactly understood by those skilled in the art. Further, the general terms used herein should be interpreted in the context as defined in the dictionary, but not in an excessively narrowed manner.

The expression of the singular number in the present disclosure includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the present disclosure, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present disclosure.

It will be understood that when an element or layer is referred to as being "connected to" or "coupled to" another element or layer, it may be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present disclosure will be described in greater detail with reference to the accompanying drawings. In describing the present disclosure, for ease of understanding, the same reference numerals are used to denote the same components throughout the drawings, and repetitive description on the same components will be omitted. Detailed description on well-known arts which are determined to make the gist of the specification unclear will be omitted. The accompanying drawings are provided to merely make the spirit of the specification readily understood, but not should be intended to be limiting of the specification. It should be understood that the spirit of the specification may be extended to its modifications, replacements or equivalents in addition to what is shown in the drawings.

As used herein, "A or B" may mean "only A", "only B", or "both A and B". In other words, "A or B" herein may be understood as "A and/or B". For example, "A, B or C"

herein means "only A", "only B", "only C", or any combination of A, B and C (any combination of A, B and C)".

As used herein, a slash (/) or a comma may mean "and/or". For example, "A/B" may mean "A and/or B". Accordingly, "A/B" may mean "only A", "only B", or "both A and B". For example, "A, B, C" may mean "A, B, or C".

As used herein, "at least one of A and B" may mean "only A", "only B", or "both A and B". In addition, the expression "at least one of A or B" or "at least one of A and/or B" may be understood as "At least one of A and B".

In addition, in this specification, "at least one of A, B and C" may mean "only A", "only B", "only C", or "any combination of A, B and C". In addition, "at least one of A, B or C" or "at least one of A, B and/or C" may mean "at least one of A, B and C".

In addition, the parentheses used herein may mean "for example". In detail, when "control information (PDCCH (Physical Downlink Control Channel))" is written herein, "PDCCH" may be proposed as an example of "control information". In other words, "control information" of the present specification is not limited to "PDCCH", and "PDDCH" may be proposed as an example of "control information". In addition, even when "control information (i.e. PDCCH)" is written, "PDCCH" may be proposed as an example of "control information".

The technical features individually described in one drawing in this specification may be implemented separately or at the same time.

As used herein, 'base station' generally refers to a fixed station that communicates with a wireless device and may be denoted by other terms such as eNB (evolved-NodeB), BTS (base transceiver system), or access point.

As used herein, 'user equipment (UE)' may be stationary or mobile, and may be denoted by other terms such as device, wireless device, terminal, MS (mobile station), UT (user terminal), SS (subscriber station), MT (mobile terminal) and etc.

Hereinafter, HARQ in 3GPP LTE is described.

<HARQ (Hybrid Automatic Repeat Request)>

In 3GPP LTE system, a synchronous HARQ is used for uplink transmission, and an asynchronous HARQ is used for downlink transmission. The synchronous HARQ is characterized that retransmission timing is fixed, and the asynchronous HARQ is characterized that retransmission timing is not fixed. That is, by using the synchronous HARQ, an initial transmission and the retransmission are performed in a HARQ cycle.

FIG. 4 exemplifies a HARQ operation between a BS and a UE.

First, a BS, i.e., an eNodeB 200 transmits scheduling information through the physical downlink control channel (PDCCH) control channel in order to transmit data to a terminal, i.e., a UE 100 in the HARQ scheme.

The UE 100 checks the incoming scheduling information by monitoring the control channel, i.e., the PDCCH.

When it is detected that there is incoming system information by checking the scheduling information, the UE 100 receives data #1 from the eNodeB 200 through the physical shared channel (PSCH) on the timing related to the PDCCH.

Similarly, the UE 100 receives data #2 from the eNodeB 200 according to the scheduling information of the PDCCH.

When receiving data, the UE 100 tries to decode the data. The UE transmits a HARQ feedback to the eNodeB 200 according to the result of decoding. That is, the UE 100 transmits ACK signal if decoding is successful, and transmits NACK signal if decoding is failed, to the eNodeB 200 through the PUCCH or the PUSCH.

When the eNodeB 200 receives the ACK signal, the eNodeB 200 detects that the data transmission is successful and transmits the next data.

However, when the eNodeB 200 receives the NACK signal, the eNodeB 200 detects that the data transmission is failed and retransmits the same data in the same form or a new form.

The UE 100 that receives the NACK signal receives the PDCCH, and tries to receive the data which is retransmitted from the eNodeB 200 according to the scheduling information of the PDCCH.

When receiving the retransmitted data, the UE 100 tries to decode the data again by combining with the data stored in a buffer as it is when failing of decoding in various ways, and transmits the ACK signal if decoding is successful and transmits the NACK signal if decoding is failed to the eNodeB 200 through the PUCCH or the PUSCH. The UE 100 repeat the process of transmitting the NACK signal and receives the retransmission until decoding of data is successful.

<Carrier Aggregation>

A carrier aggregation system is now described.

A carrier aggregation system aggregates a plurality of component carriers (CCs). A meaning of an existing cell is changed according to the above carrier aggregation. According to the carrier aggregation, a cell may signify a combination of a downlink component carrier and an uplink component carrier or an independent downlink component carrier.

Further, the cell in the carrier aggregation may be classified into a primary cell, a secondary cell, and a serving cell. The primary cell signifies a cell operated in a primary frequency. The primary cell signifies a cell which UE performs an initial connection establishment procedure or a connection reestablishment procedure or a cell indicated as a primary cell in a handover procedure. The secondary cell signifies a cell operating in a secondary frequency. Once the RRC connection is established, the secondary cell is used to provide an additional radio resource.

As described above, the carrier aggregation system may support a plurality of component carriers (CCs), i.e., a plurality of serving cells unlike a single carrier system.

The carrier aggregation system may support a cross-carrier scheduling. The cross-carrier scheduling is a scheduling method capable of performing resource allocation of a PDSCH transmitted through other component carrier through a PDCCH transmitted through a specific component carrier and/or resource allocation of a PUSCH transmitted through other component carrier different from a component carrier basically linked with the specific component carrier.

<Next-Generation Mobile Communication Network>

Thanks to the success of long term evolution (LTE)/LTE-advanced (LTE-A) for 4G mobile communication, interest in the next generation, i.e., 5-generation (so called 5G) mobile communication has been increased and researches have been continuously conducted.

The 5G mobile telecommunications defined by the International Telecommunication Union (ITU) refers to providing a data transmission rate of up to 20 Gbps and a feel transmission rate of at least 100 Mbps or more at any location. The official name is 'IMT-2020' and its goal is to be commercialized worldwide in 2020.

ITU proposes three usage scenarios, e.g., enhanced Mobile BroadBand (eMBB) and massive machine type communication (mMTC) and ultra reliable and low latency communications (URLLC).

URLLC relates to usage scenarios that require high reliability and low latency. For example, services such as autonomous navigation, factory automation, augmented reality require high reliability and low latency (e.g., a delay time of 1 ms or less). Currently, the delay time of 4G (LTE) is statistically 21 to 43 ms (best 10%) and 33 to 75 ms (median). This is insufficient to support a service requiring a delay time of 1 ms or less. Next, an eMBB usage scenario relates to a usage scenario requiring a mobile ultra-wideband.

That is, the 5G mobile communication system aims at higher capacity than the current 4G LTE, may increase the density of mobile broadband users, and may support device to device (D2D), high stability and machine type communication (MTC). 5G research and development also aims at a lower latency time and lower battery consumption than a 4G mobile communication system to better implement the Internet of things. A new radio access technology (New RAT or NR) may be proposed for such 5G mobile communication.

Figure 5A:
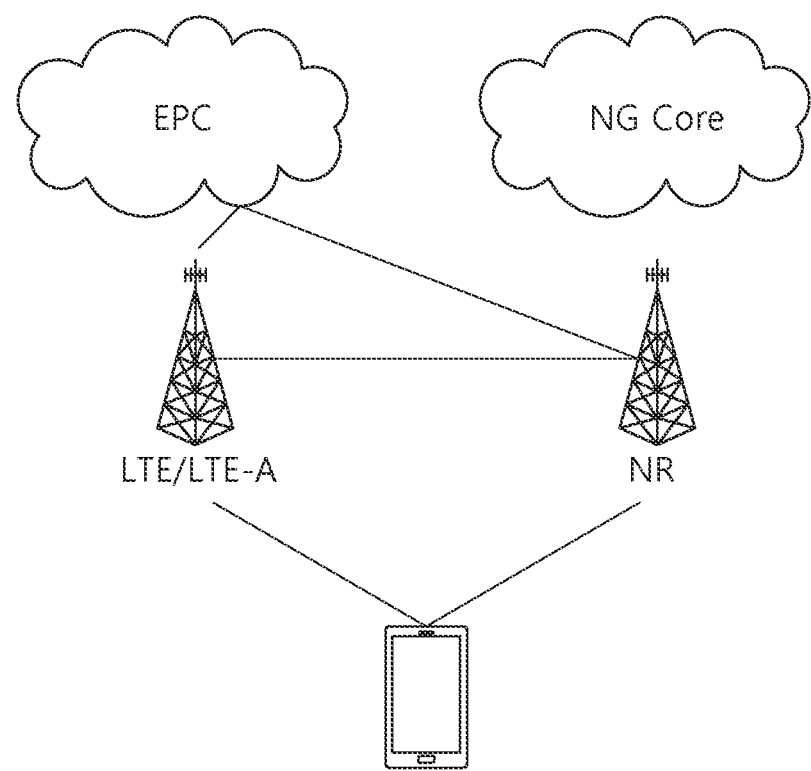
FIG. 5A to 5C are exemplary views illustrating an exemplary architecture for a service of next generation mobile communication.
Figure 5B:
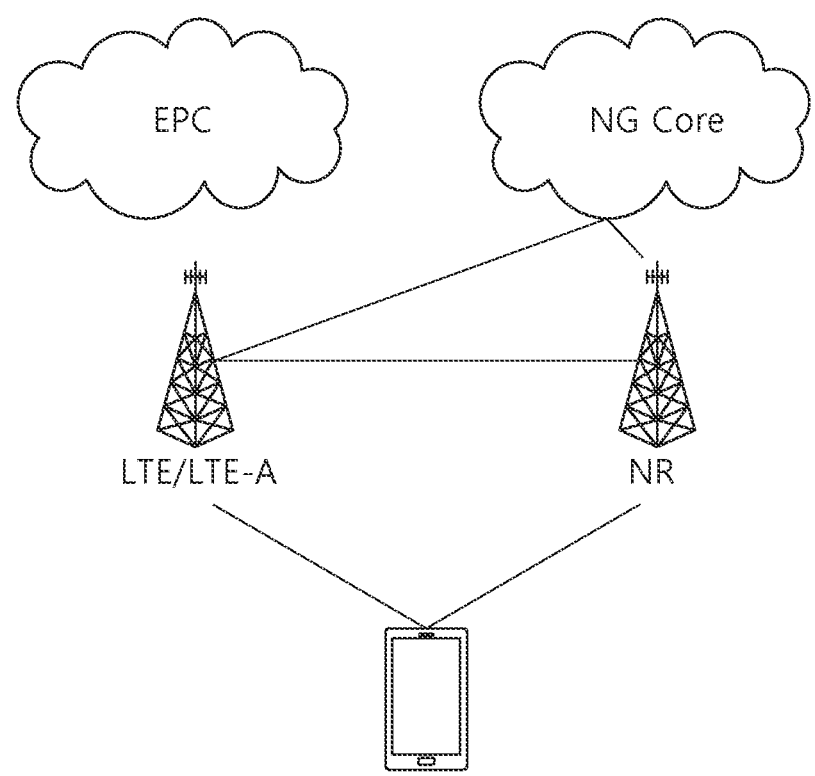
Figure 5C:
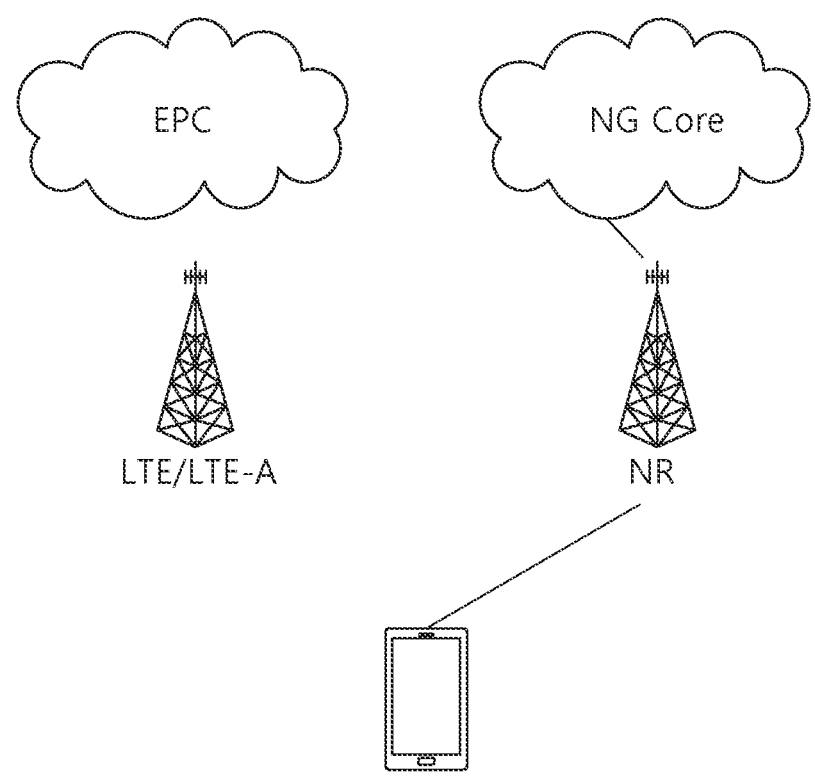

FIGS. 5A to 5C are exemplary diagrams illustrating exemplary architectures for services of the next generation mobile communication.

Referring to FIG. 5A, the UE is connected to LTE/LTE-A based cells and NR based cells in a dual connectivity (DC) manner.

The NR-based cell is connected to a core network for existing 4G mobile communication, i.e., an evolved packet core (EPC).

Referring to FIG. 5B, unlike FIG. 5A, the LTE/LTE-A based cell is connected to a core network for the 5G mobile communication, i.e., a next generation (NG) core network.

The service scheme based on the architecture as illustrated in FIGS. 5A and 5B is called non-standalone (NSA).

Referring to FIG. 5C, the UE is connected only to NR-based cells. The service method based on such an architecture is called standalone (SA).

On the other hand, in the NR, it may be considered that the reception from the base station uses a downlink subframe, and the transmission to the base station uses an uplink subframe. This method may be applied to paired spectra and unpaired spectra. A pair of spectra means that the two carrier spectra are included for downlink and uplink operations. For example, in a pair of spectra, one carrier may include a downlink band and an uplink band that are paired with each other.

Figure 6:
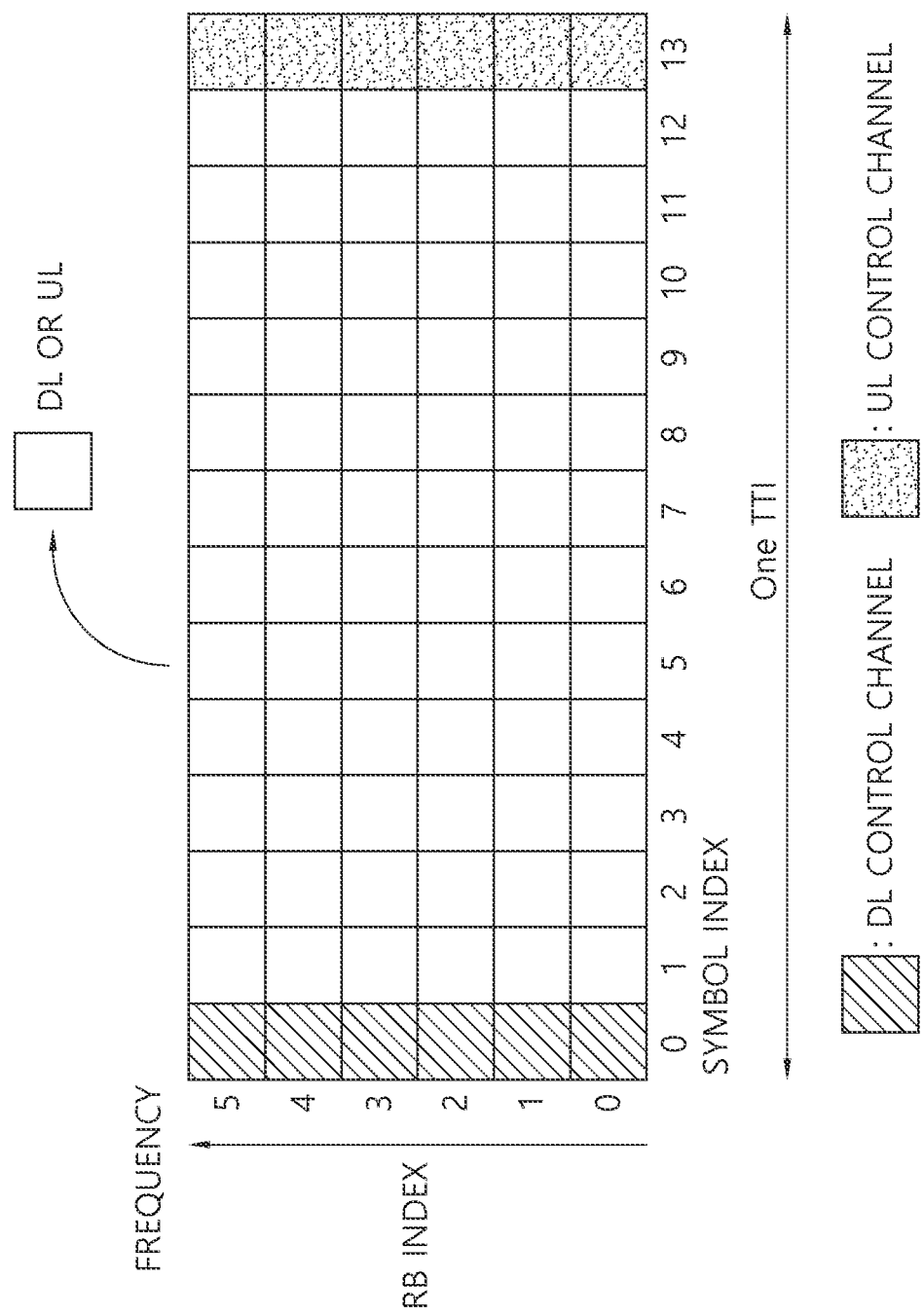
FIG. 6 shows an example of a subframe type in NR.

FIG. 6 Illustrates an Example of a Subframe Type in NR.

A transmission time interval (TTI) shown in FIG. 6 may be referred to as a subframe or slot for NR (or new RAT). The subframe (or slot) of FIG. 6 may be used in a TDD system of NR (or new RAT) to minimize the data transmission delay. As illustrated in FIG. 5, a subframe (or slot) includes 14 symbols, like the current subframe. The front symbol of the subframe (or slot) may be used for a DL control channel, and the rear symbol of the subframe (or slot) may be used for a UL control channel. The remaining symbols may be used for DL data transmission or UL data transmission. According to such a subframe (or slot) structure, downlink transmission and uplink transmission may be sequentially performed in one subframe (or slot). Accordingly, downlink data may be received within a subframe (or slot), and an uplink acknowledgment response (ACK/NACK) may be transmitted within the subframe (or slot). The structure of such a subframe (or slot) may be referred to as a self-contained subframe (or slot). The use of such a sub-frame (or slot) structure has an advantage that the time taken to retransmit the data where a receive error occurs is reduced and a latency time of the last data transmission may be minimized. In such a self-contained subframe (or slot) structure, a time gap may be required in a transition process from the transmission mode to the reception mode or from the reception mode to the transmission mode. To this end, some OFDM symbols at the time of switching from DL to UL in the subframe structure may be configured as a guard period (GP).

<Support of Various Numerologies>

In the next system, a number of numerologies may be provided to the UE with the development of a wireless communication technology.

The numerology may be defined by a cycle prefix (CP) length and a subcarrier spacing. One cell may provide a plurality of numerologies to the UE. When the index of the numerology is denoted by $\mu$, each subcarrier interval and corresponding CP length may be as shown in table below.

TABLE 1

| $\mu$ | $\Delta f = 2^{\mu} \cdot 15$ [kHz] | CP |
|---|---|---|
| 0 | 15 | Normal |
| 1 | 30 | Normal |
| 2 | 60 | Normal, extended |
| 3 | 120 | Normal |
| 4 | 240 | Normal |

In the case of a normal CP, when the index of the numerology is denoted by $\mu$, the number $N^{slot}_{symb}$ of OFDM symbols per slot, the number $N^{frame,\mu}_{slot}$ of slots per frame, and the number $N^{subframe,\mu}_{slot}$ of slots per subframe are shown in Table below.

TABLE 2

| $\mu$ | $N^{slot}_{symb}$ | $N^{frame,\mu}_{slot}$ | $N^{subframe,\mu}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

In the case of an extended CP, when the index of the numerology is denoted by $\mu$, the number $N^{slot}_{symb}$ of OFDM symbols per slot, the number $N^{frame,\mu}_{slot}$ of slots per frame, and the number $N^{subframe,\mu}_{slot}$ of slots per subframe are shown in Table below.

TABLE 3

| $\mu$ | $N^{slot}_{symb}$ | $N^{frame,\mu}_{slot}$ | $N^{subframe,\mu}_{slot}$ |
|---|---|---|---|
| 2 | 12 | 40 | 4 |

Meanwhile, in the next-generation mobile communication, each symbol in a symbol may be used as a downlink or as an uplink as shown in table below. In the following table, the uplink is denoted by U and the downlink is denoted by D. In Table below, X represents a symbol that may be used flexibly in the uplink or downlink.

TABLE 4

| For-mat | Symbol number in slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | X | X | X | X | X | X | X | X | X | X | X | X | X | X |
| 3 | D | D | D | D | D | D | D | D | D | D | D | D | D | X |
| 4 | D | D | D | D | D | D | D | D | D | D | D | D | X | X |
| 5 | D | D | D | D | D | D | D | D | D | D | D | X | X | X |
| 6 | D | D | D | D | D | D | D | D | D | D | X | X | X | X |
| 7 | D | D | D | D | D | D | D | D | D | X | X | X | X | X |
| 8 | X | X | X | X | X | X | X | X | X | X | X | X | X | U |
| 9 | X | X | X | X | X | X | X | X | X | X | X | X | U | U |
| 10 | X | U | U | U | U | U | U | U | U | U | U | U | U | U |
| 11 | X | X | U | U | U | U | U | U | U | U | U | U | U | U |
| 12 | X | X | X | U | U | U | U | U | U | U | U | U | U | U |
| 13 | X | X | X | X | U | U | U | U | U | U | U | U | U | U |
| 14 | X | X | X | X | X | U | U | U | U | U | U | U | U | U |
| 15 | X | X | X | X | X | X | U | U | U | U | U | U | U | U |
| 16 | D | X | X | X | X | X | X | X | X | X | X | X | X | X |
| 17 | D | D | X | X | X | X | X | X | X | X | X | X | X | X |
| 18 | D | D | D | X | X | X | X | X | X | X | X | X | X | X |
| 19 | D | X | X | X | X | X | X | X | X | X | X | X | X | U |
| 20 | D | D | X | X | X | X | X | X | X | X | X | X | X | U |
| 21 | D | D | D | X | X | X | X | X | X | X | X | X | X | U |
| 22 | D | X | X | X | X | X | X | X | X | X | X | X | U | U |
| 23 | D | D | X | X | X | X | X | X | X | X | X | X | U | U |
| 24 | D | D | D | X | X | X | X | X | X | X | X | X | U | U |
| 25 | D | X | X | X | X | X | X | X | X | X | X | U | U | U |
| 26 | D | D | X | X | X | X | X | X | X | X | X | U | U | U |
| 27 | D | D | D | X | X | X | X | X | X | X | X | U | U | U |
| 28 | D | D | D | D | D | D | D | D | D | D | D | X | X | U |
| 29 | D | D | D | D | D | D | D | D | D | D | X | X | X | U |
| 30 | D | D | D | D | D | D | D | D | D | X | X | X | X | U |
| 31 | D | D | D | D | D | D | D | D | D | D | X | U | U | U |
| 32 | D | D | D | D | D | D | D | D | D | X | X | U | U | U |
| 33 | D | D | D | D | D | D | D | D | X | X | X | U | U | U |
| 34 | D | X | U | U | U | U | U | U | U | U | U | U | U | U |
| 35 | D | D | X | U | U | U | U | U | U | U | U | U | U | U |
| 36 | D | D | D | X | U | U | U | U | U | U | U | U | U | U |
| 37 | D | X | X | U | U | U | U | U | U | U | U | U | U | U |
| 38 | D | D | X | X | U | U | U | U | U | U | U | U | U | U |
| 39 | D | D | D | X | X | U | U | U | U | U | U | U | U | U |
| 40 | D | X | X | X | U | U | U | U | U | U | U | U | U | U |
| 41 | D | D | X | X | X | U | U | U | U | U | U | U | U | U |
| 42 | D | D | D | X | X | X | U | U | U | U | U | U | U | U |
| 43 | D | D | D | D | D | D | D | D | X | X | X | X | X | U |
| 44 | D | D | D | D | D | X | X | X | X | X | X | U | U | U |
| 45 | D | D | D | D | D | X | X | U | U | U | U | U | U | U |
| 46 | D | D | D | D | D | X | D | D | D | D | D | D | D | X |
| 47 | D | D | D | D | X | X | D | D | D | D | D | D | X | X |
| 48 | D | D | X | X | X | X | D | D | X | X | X | X | X | X |
| 49 | D | X | X | X | X | X | D | X | X | X | X | X | X | X |
| 50 | X | U | U | U | U | U | X | U | U | U | U | U | U | U |
| 51 | X | X | U | U | U | U | X | X | U | U | U | U | U | U |
| 52 | X | X | X | U | U | U | X | X | X | U | U | U | U | U |
| 53 | X | X | X | X | U | U | X | X | X | X | U | U | U | U |
| 54 | D | D | D | D | X | U | D | D | D | D | D | X | D | U |
| 55 | D | D | X | U | U | U | D | D | X | U | U | U | U | U |
| 56 | D | X | U | U | U | U | D | X | U | U | U | U | U | U |
| 57 | D | D | D | X | X | U | D | D | D | X | X | X | X | U |
| 58 | D | D | X | X | U | U | D | D | X | X | U | U | U | U |
| 59 | D | X | X | U | U | U | D | X | X | U | U | U | U | U |
| 60 | D | X | X | X | X | U | D | X | X | X | X | X | X | U |
| 61 | D | D | X | X | X | X | U | D | D | X | X | X | X | U |

<SS Block in NR>

In 5G NR, the UE defines a physical block channel (PBCH) including information required to perform an initial access, i.e., a master information block (MIB) and a synchronization signal SS (including PSS and SSS). In addition, a plurality of SS blocks are bound to be defined as an SS burst, and a plurality of SS bursts are bound to be defined as an SS burst set. Each SS block is assumed to be beamformed in a specific direction, and several SS blocks in the SS burst set are designed to support UEs in different directions.

Figure 7:
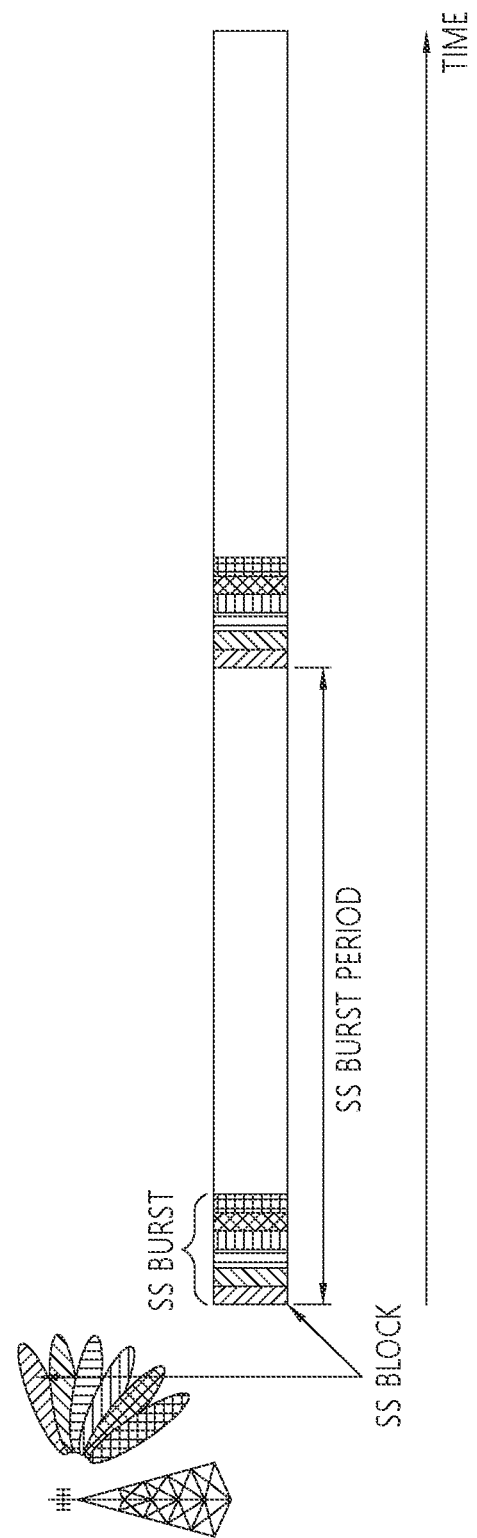
FIG. 7 is an exemplary view showing an example of an SS block in NR.

FIG. 7 is an exemplary diagram illustrating an example of an SS block in NR.

Referring to FIG. 7, the SS burst is transmitted every predetermined periodicity. Therefore, the UE receives the SS block and performs cell detection and measurement.

On the other hand, in 5G NR, beam sweeping is performed on the SS. Hereinafter, it will be described with reference to FIG. 8.

Figure 8:
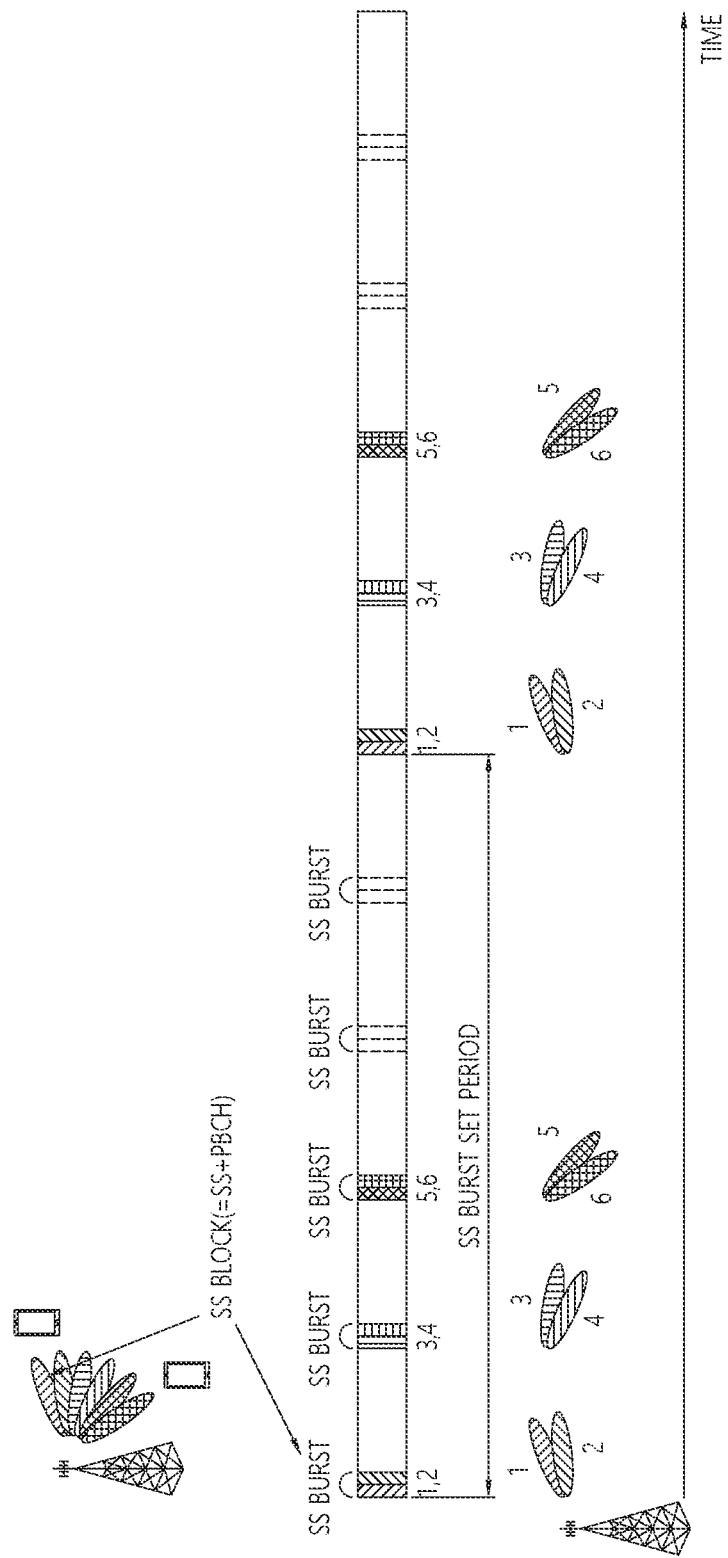
FIG. 8 is an exemplary view showing an example of beam sweeping in NR.

FIG. 8 is an exemplary diagram illustrating an example of beam sweeping in NR.

The base station transmits each SS block in the SS burst with beam sweeping over time. Here, the SS blocks in the SS burst set are transmitted in order to support UEs existing in different directions. In FIG. 7, the SS burst set includes SS blocks 1 to 6, and each SS burst includes two SS blocks.

<Problem to be Solved by Disclosure of the Present Specification>

Figure 9:
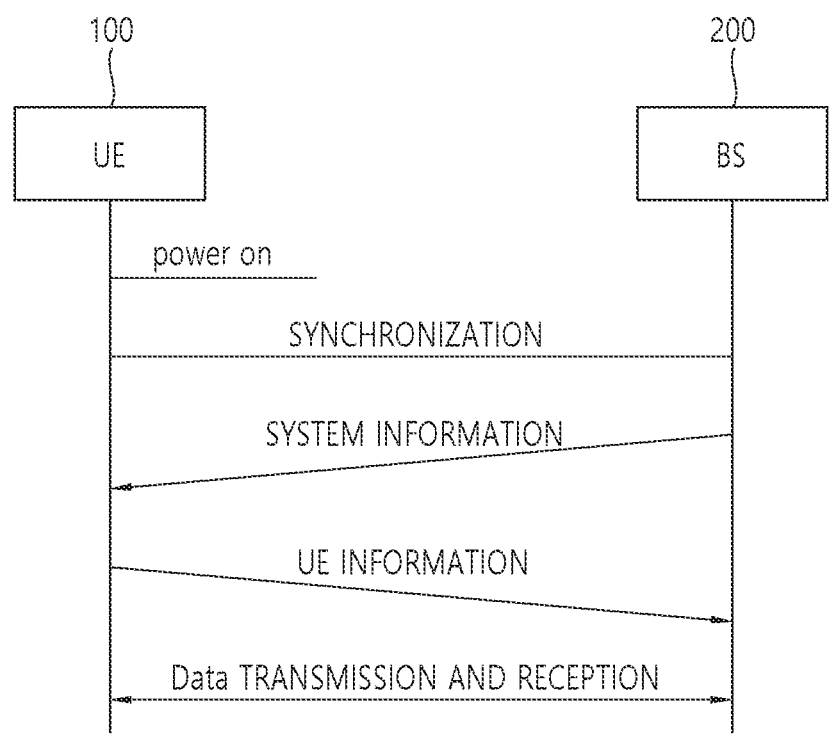
FIG. 9 is an exemplary view showing a general communication procedure.

FIG. 9 is an exemplary view showing a general communication procedure.

Figure 3:
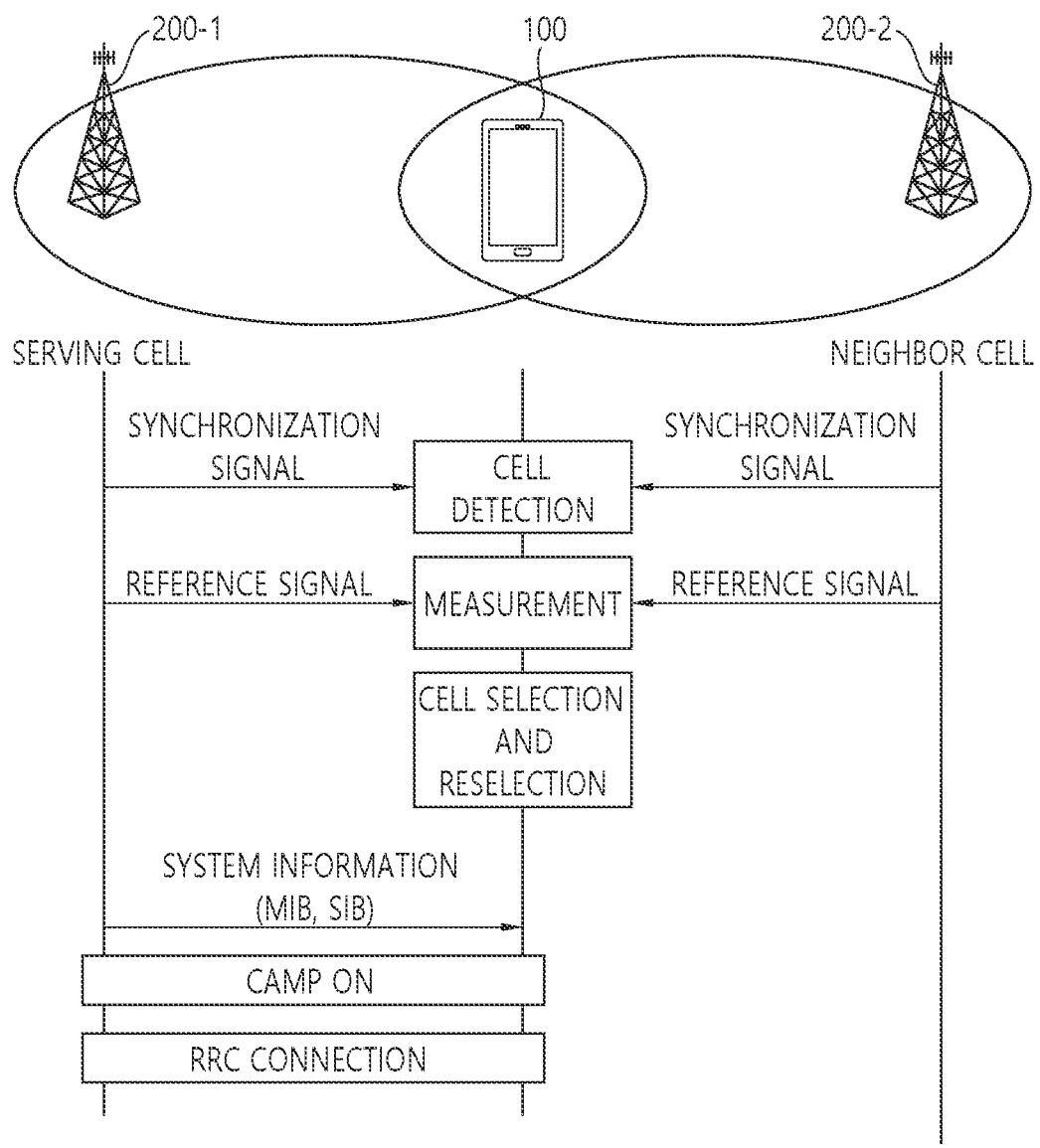
FIG. 3 is a flowchart showing an initial access process.

Referring to FIG. 9, when the user equipment (UE) is powered on as described above in FIG. 3, and the UE receives the synchronization signals, i.e., the PSS and the SSS, from the BSs, and identify cells by obtaining cell IDs through the synchronization signals.

Subsequently, the UE 100 performs cell measurement through a reference signal, e.g., a synchronization signal (SS) or channel status information reference signal (CSI-RS). The UE measures the RSRP and the RSRQ by measuring the SS or CRS-RS. In addition, the UE may calculate feedback information such as channel quality information (CQI), precoding matrix indicator (PMI), and rank indicator (RI) through the CRS-RS.

The UE 100 receives system information such as a master Information block (MIB) and a system information block (SIB) from the BSs. The MIB may be received through a physical broadcast channel (PBCH), and the SIB may be received through a physical downlink shared channel (PDSCH). The UE 100 camps on a cell of a BS and establishes an RRC connection.

In the synchronized state, the BS may transmit system information to the UE.

The UE may transmit UE information to the BS. The UE information may include UE capability information.

Then, the UE and the BS may transmit and receive data as described above in FIG. 4.

Various attempts have been made to reduce a peak-to-average power ratio (PAPR) in data transmission and reception but specific methods for practical application have not been presented.

DISCLOSURE OF PRESENT SPECIFICATION

Figure 10:
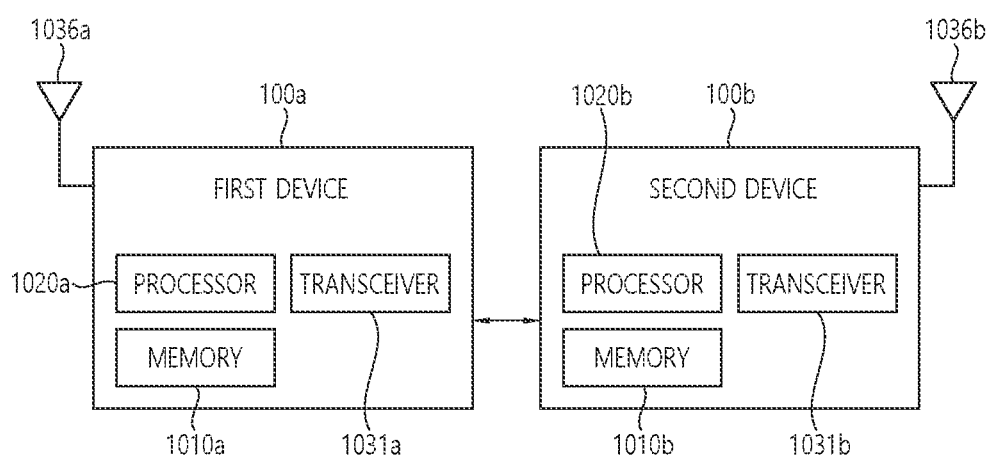
FIG. 10 shows a wireless communication system to implement the disclosure of the present specification.

FIG. 10 shows a wireless communication system to implement the disclosure of the present specification.

Referring to FIG. 10, a wireless communication system for implementing the disclosure of the present specification may include a first device 100a and a second device 100b.

The first device 100a may be the user equipment (UE) described in the disclosure of the present specification.

The second device 100b may be the BS described in the disclosure of the present specification.

The first device 100a may include at least one processor such as a processor 1020a, at least one memory such as a memory 1010a, and at least one transceiver such as a transceiver 1031a. The processor 1020a may perform functions, procedures, and/or methods described below. The processor 1020a may perform one or more protocols. For example, the processor 1020*a* may perform one or more layers of a radio interface protocol. The memory 1010*a* may be connected to the processor 1020*a* and may store various types of information and/or instructions. The transceiver 1031*a* may be connected to the processor 1020*a* and may be controlled to transmit and receive wireless signals.

The second device 100*b* may include at least one processor such as a processor 1020*b*, at least one memory device such as a memory 1010*b*, and at least one transceiver such as a transceiver 1031*b*. The processor 1020*b* may perform functions, procedures, and/or methods described below. The processor 1020*b* may implement one or more protocols. For example, the processor 1020*b* may implement one or more layers of a radio interface protocol. The memory 1010*b* may be connected to the processor 1020*b* and may store various types of information and/or instructions. The transceiver 1031*b* may be connected to the processor 1020*b* and may be controlled to transmit and receive wireless signals.

The memory 1010*a* and/or the memory 1010*b* may be connected to each other inside or outside the processor 1020*a* and/or the processor 1020*b* and may be connected to another processor through various technologies such as wired or wireless connection.

The first device 100*a* and/or the second device 100*b* may have one or more antennas. For example, antenna 1036*a* and/or antenna 1036*b* may be configured to transmit and receive wireless signals.

Figure 11A:
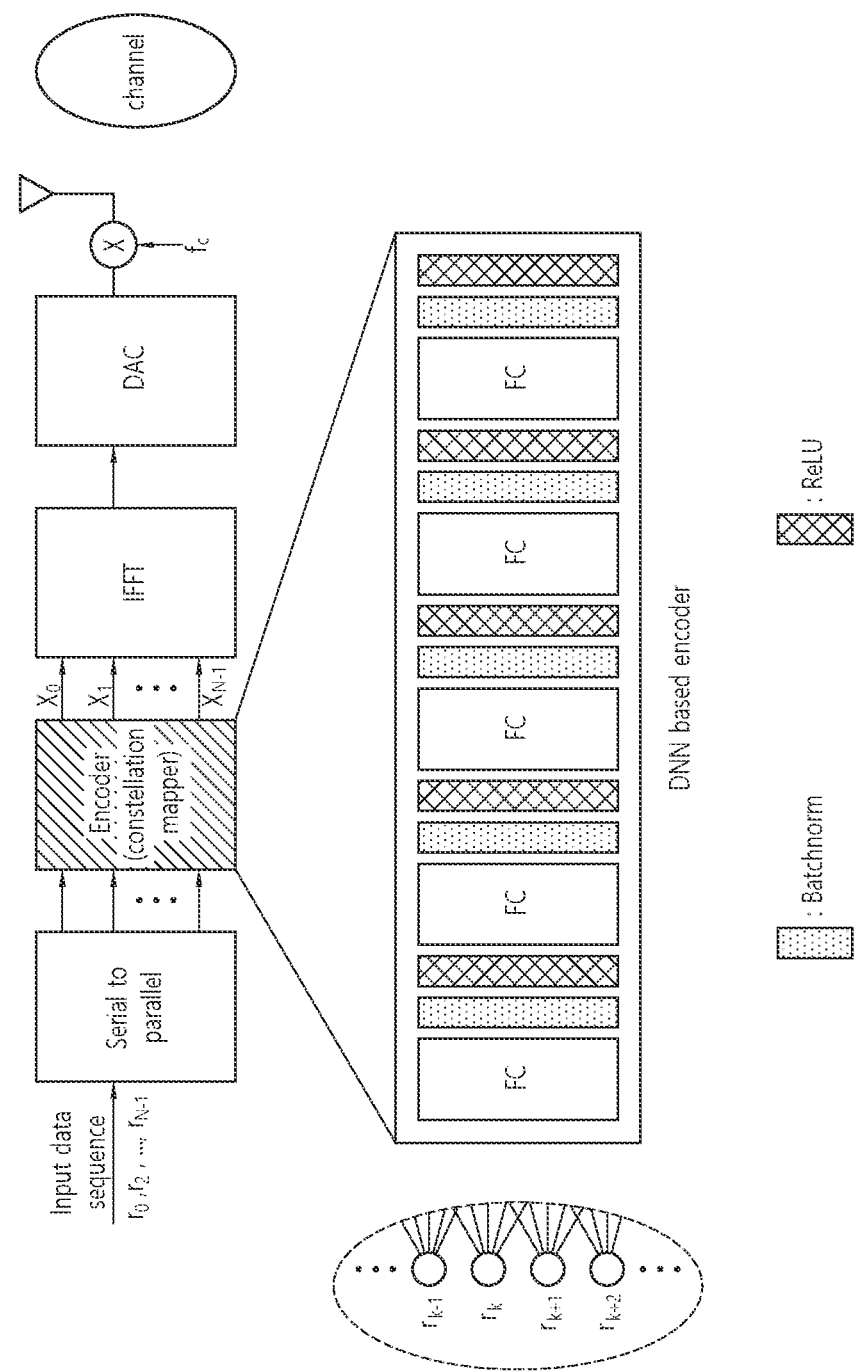
FIGS. 11A and 11B are detailed block diagrams of a transceiver illustrated in FIG. 10.
Figure 11B:
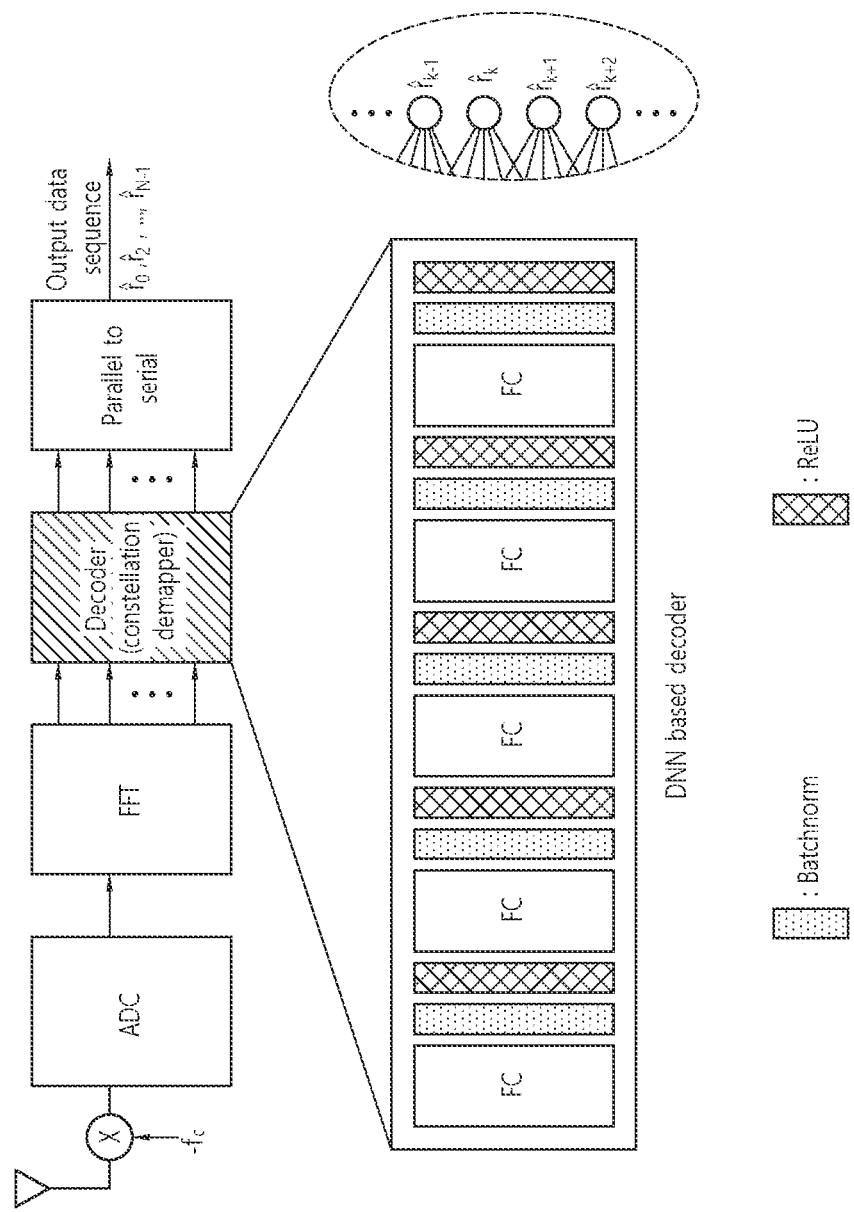

FIGS. 11A and 11B are detailed block diagrams of the transceiver illustrated in FIG. 10.

FIG. 11A shows a configuration of a part in charge of a transmission function in the transceiver illustrated in FIG. 10, i.e., a configuration of a transmitting part.

The transmitting part includes a serial-to-parallel (SP) converter, an encoder, an inverse fast Fourier transform (IFFT), a digital-to-analog converter (DAC), and a synthesizer. The SP converter converts an input data sequence in parallel. The encoder encodes the parallel-converted input data and outputs a generated symbol. The IFFT performs IFFT on the symbol to output a baseband signal in a time domain. The DAC converts the baseband signal to an analog signal. The synthesizer synthesizes the converted analog signal with a carrier wave $f_c$ and transmits the same.

The encoder may be implemented as a deep neural network (DNN) for artificial intelligence.

FIG. 11B shows a configuration of a part in charge of a reception function in the transceiver illustrated in FIG. 10, i.e., a configuration of a receiving part.

The receiver includes a synthesizer, an analog-to-digital converter (ADC), a fast Fourier transform (FFT), a decoder, and a parallel-to-serial (PS) converter. The synthesizer removes a carrier wave from a received signal. The FFT serves to convert a time domain into a frequency domain for the received signal from which the carrier wave was removed. The decoder decodes the received signal which has been converted into the frequency domain.

The decoder may be implemented as a deep neural network (DNN) for artificial intelligence.

As described above, according to the disclosure of the present specification, the encoder and decoder may be implemented as a DNN for artificial intelligence.

Figure 12:
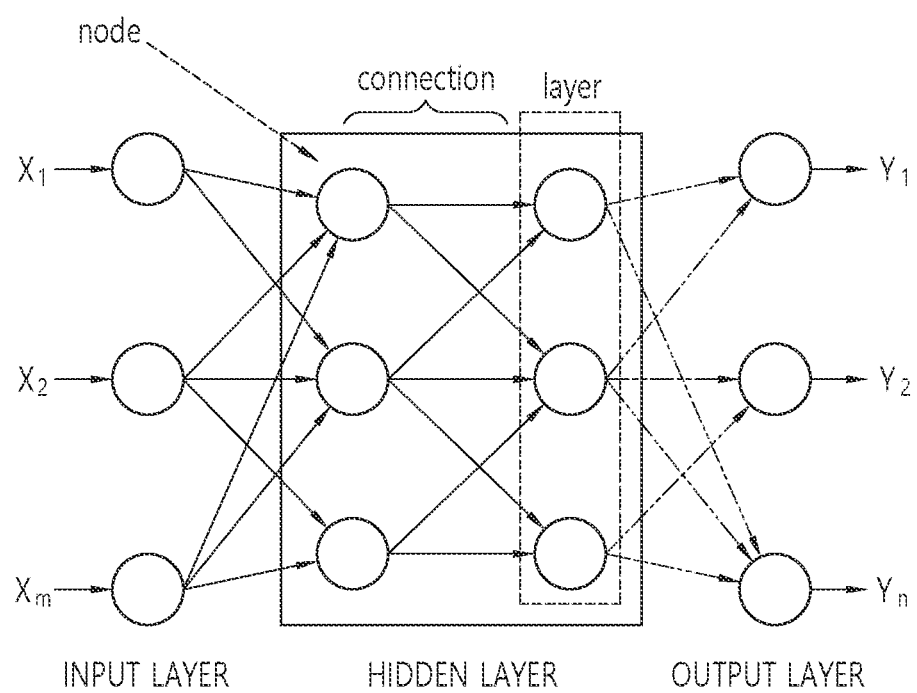
FIG. 12 is an exemplary view showing a concept of a deep neural network (DNN) for artificial intelligence.

FIG. 12 is an exemplary diagram showing the concept of DNN for artificial intelligence.

As illustrated in FIG. 12, the DNN for artificial intelligence may include an input layer, a hidden layer, and an output layer. Each of the input layer, the hidden layer, and the output layer may include a plurality of nodes.

I. First Disclosure

Figure 13:
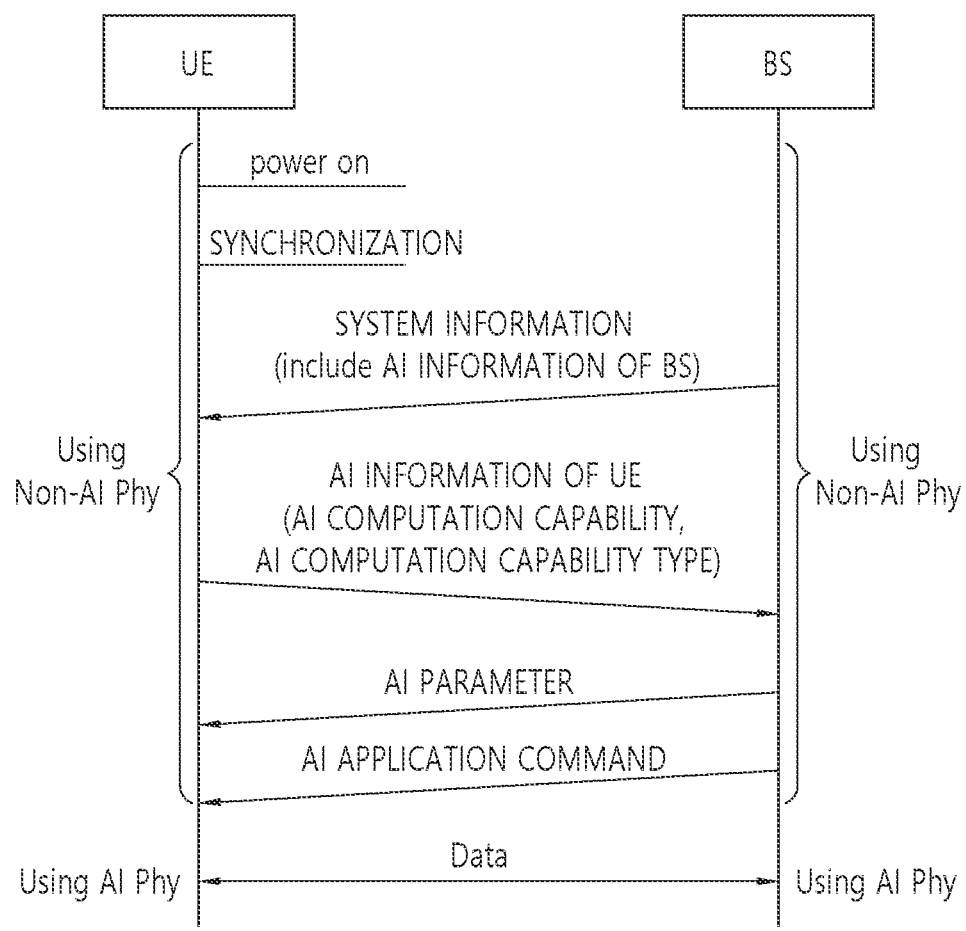
FIG. 13 is an exemplary view showing a method according to a first disclosure of the present specification.

FIG. 13 is an exemplary view showing a method according to the first disclosure of the present specification.

Referring to FIG. 13, a UE or a BS may perform an encoding or decoding process for data transmission and reception. The UE or the BS may apply artificial intelligence (AI) to an encoding or decoding process. As the AI field develops, the application fields for the technology are also expanding. By applying AI to the encoding or decoding process, a peak-to-average power ratio (PAPR) may be reduced to enable efficient data transmission and reception.

As described above in FIG. 3, after the UE is powered on, the UE may receive synchronization signals, i.e., a primary synch signal (PSS) and a secondary synch signal (SSS), from the BS and obtain cell IDs through the synchronization signals, thereby identifying cells.

Subsequently, the UE may calculate signal strength such as reference signals received power (RSRP) and reference signal received quality (RSRQ) and feedback information such as channel quality information (CQI), a precoding matrix indicator (PMI), a rank indicator (RI) through a reference signal, e.g., CSI-RS.

The UE receives system information such as a master information block (MIB) and a system information block (SIB) from the BS. The MIB may be received through a physical broadcast channel (PBCH), and the SIB may be received through a physical downlink shared channel (PDSCH). The UE camps on a cell of the BS and establishes an RRC connection.

In the synchronized state, the BS may transmit system information to the UE. The system information may include AI information of the BS.

Here, the AI information provided from the BS may include an AI supportable type and an AI computation capability, and this may be expressed as a class.

For example, NB AI class A may not support AI. NB AI class B may support up to 3 nodes, up to 3 layers, full connection, CNN and a MIMO receiver. NB AI class C may support up to 10 nodes, up to 10 layers, full connection, CNN/RNN, QAM detector, and a MIMO receiver.

The UE may transmit capability information of the UE to the BS. The capability information of the UE may include AI computation related information such as AI computation capability (supportable network types, number of layers, number of nodes, connection method), AI computation capability type (channel estimation, MIMO reception, data encoding/decoding, channel feedback).

Here, the UE capability information provided by the UE may include an AI supportable type and an AI computation capability value, and this may be expressed as a class.

For example, NB AI class A may not support AI. NB AI class B may support up to 3 nodes, up to 3 layers, full connection, CNN, and a MIMO receiver. NB AI class C may support up to 10 nodes, up to 10 layers, full connection, CNN/RNN, a QAM detector, and a MIMO receiver.

The BS may have a plurality of AI parameter sets that may be selectively used according to an application environment.

The BS may transmit, to the UE, at least one AI parameter to be used when applying AI to the encoding or decoding process among the plurality of AI parameter sets. The AI parameter may include a plurality of information, such as the number of layers, the number of nodes, a connection method, and a network type, which are AI calculation capability values.

After the UE receives the AI parameter, the BS may transmit an AI application command.

The UE and the BS may apply AI in the encoding or decoding process using the AI parameter by the AI application command.

Figure 14:
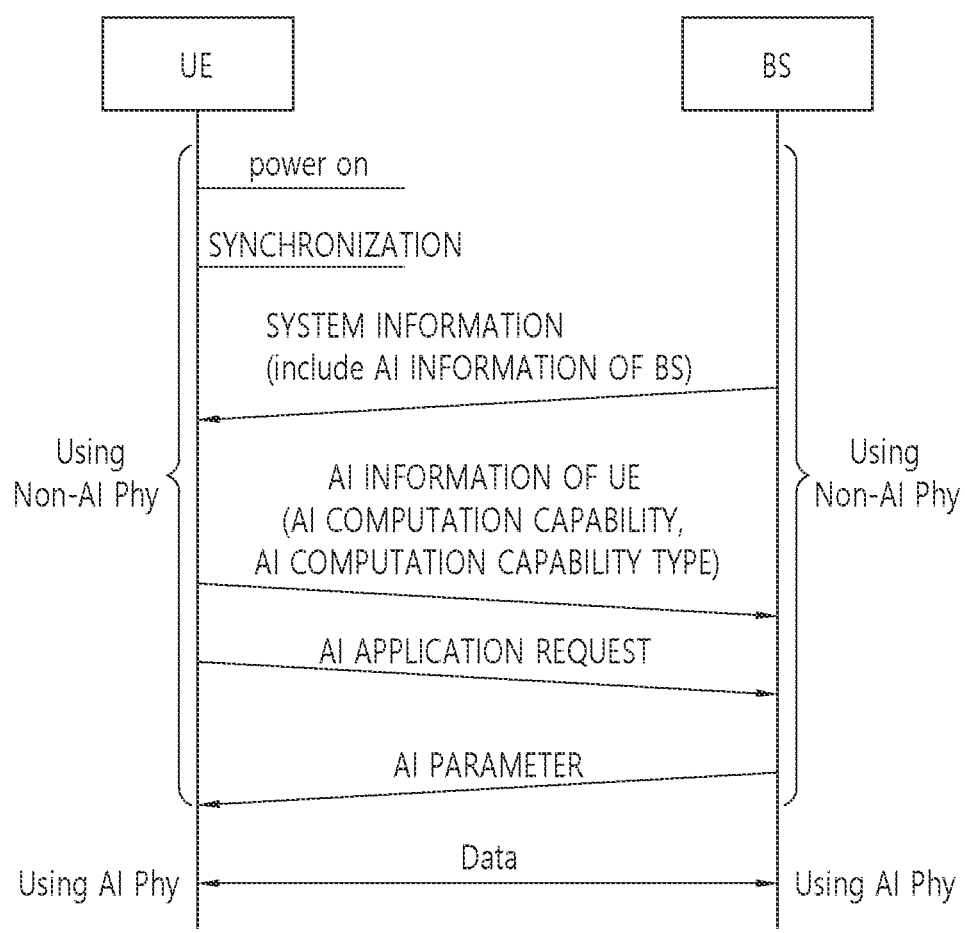
FIG. 14 is an exemplary view showing a method according to a second disclosure of the present specification.

FIG. 14 is an exemplary view showing a method according to a second disclosure of the present specification.

Referring to FIG. 14, if the UE is powered on and synchronized, the BS may transmit system information to the UE. The system information may include AI information of the BS.

The UE may transmit the capability information of the UE to the BS. The capability information of the UE may include AI computation related information such as AI computation capability value and AI computation availability type.

After the BS receives the capability information of the UE, the UE may transmit an AI application request to the BS.

The BS may have a plurality of AI parameter sets that may be selectively used based on an application environment.

The BS may transmit, to the UE, at least one AI parameter to be used when applying AI to the encoding or decoding process among the plurality of AI parameter sets. The AI parameter may include a plurality of information, such as the number of layers, the number of nodes, a connection method, and a network type, which are AI calculation capability values.

Then, the BS and the UE may apply AI to the encoding or decoding process using the AI parameter.

Figure 15:
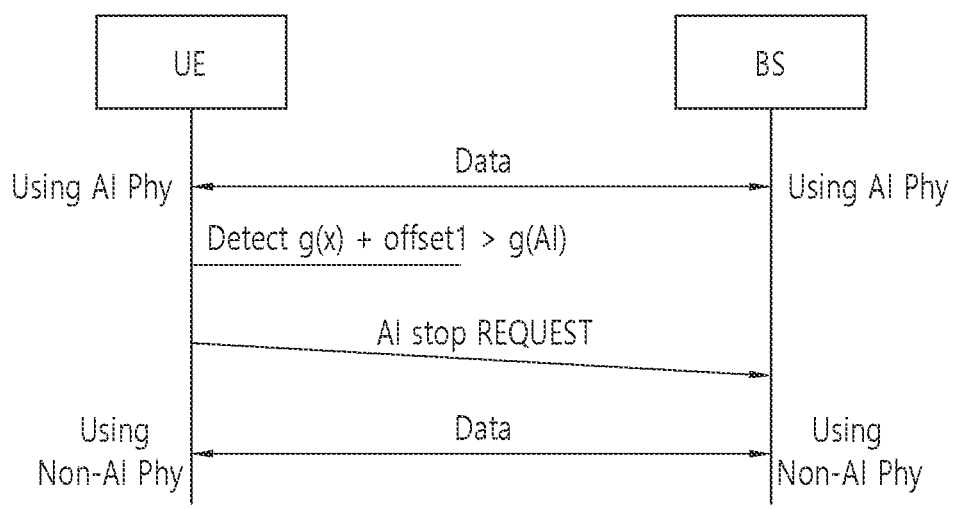
FIG. 15 is an exemplary view showing a method according to a third disclosure of the present specification.

FIG. 15 is an exemplary view showing a method according to a third disclosure of the present specification.

Referring to FIG. 15, a reference offset (offset1) may be first set as a reference value for determining whether to apply AI to data transmission/reception or whether to stop applying the AI, after the UE and the BS apply AI parameters to encoding or decoding required for data transmission and reception.

The UE and the BS may perform measurement on data received from the BS in the process of transmitting and receiving data by applying AI to encoding or decoding. The measurement target may include reference signal received power (RSRP), received signal strength intensity (RSSI), a signal to noise ratio (SNR), and the like, and may include measurements regarding other quality.

The UE may measure RSRP, RSSI, and SNR when data is received by applying AI.

The UE may measure RSRP, RSSI, and SNR when data is received without applying AI. The UE may calculate a difference between the measurement values described above. When the calculated difference value exceeds the reference offset (offset1), the UE may transmit an AI stop request to the BS. Then, the UE and the BS may stop applying AI to encoding or decoding and transmit and receive data. A formula for the reference offset is as follows.

$$g(RS)+offset_1>g(S_{AI})$$

if there is a difficulty in an operation state of the UE in applying AI to encoding or decoding, the UE request to stop applying AI to the BS. The difficulty in the operation state of the UE may include a case where power consumption is too high or a case where a memory is insufficient.

When there is no difficulty in the operation state for the UE, the UE and the BS may perform data transmission and reception by applying AI to encoding or decoding through steps such as in a fourth disclosure described later.

Figure 16:
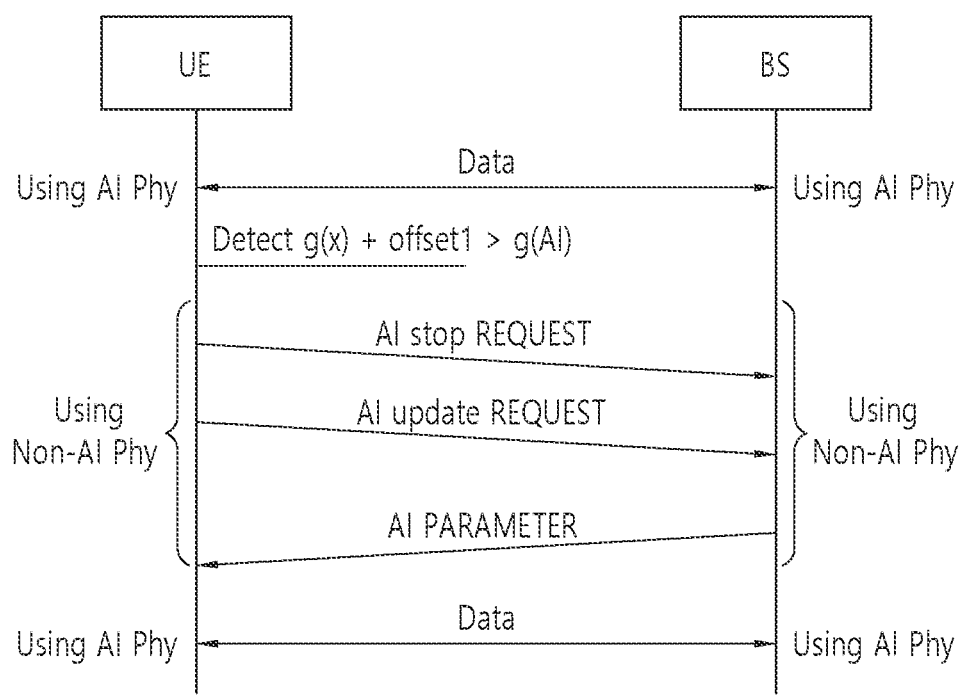
FIG. 16 is an exemplary view showing a method according to a fourth disclosure of the present specification.

FIG. 16 is an exemplary view showing a method according to the fourth disclosure of the present specification.

Referring to FIG. 16, a reference offset (offset1) may be first set as a reference value for determining whether to apply AI to data transmission/reception or whether to stop applying the AI, after the UE and the BS apply AI parameters to encoding for data transmission or decoding for data reception.

The UE and the BS may perform measurement on data received from the BS in the process of transmitting and/or receiving data by applying AI to encoding and/or decoding. The measurement target may include reference signal received power (RSRP), received signal strength intensity (RSSI), a signal to noise ratio (SNR), and the like, and may include measurements regarding other quality.

The UE may measure RSRP, RSSI, and SNR when data is received by applying AI. The UE may measure RSRP, RSSI, and SNR when data is received without applying AI. The UE may calculate a difference between the measurement values described above. When the calculated difference value exceeds the reference offset (offset1), the UE may transmit an AI stop request to the BS. Then, the UE and the BS may stop applying AI to encoding for transmitting data or decoding for receiving data. A formula for the reference offset is as follows.

$$g(RS)+offset_1>g(SAT)$$

If there is no difficulty in the operation state of the UE in applying AI to encoding or decoding, the UE may transmit an AI update request to the BS.

The BS may have a plurality of AI parameter sets that may be selectively used according to an application environment.

The BS may transmit, to the UE, at least one new AI parameter to be used when applying AI to the encoding or decoding process among the plurality of AI parameter sets by the AI update request. The new AI parameters may include a plurality of information such as the number of layers, the number of nodes, a connection method, and a network type, which are AI calculation capability values.

The UE and the BS may reapply AI to encoding or decoding using new AI parameters.

Then, the UE and the BS may transmit and receive data by applying AI to encoding or decoding.

Figure 17:
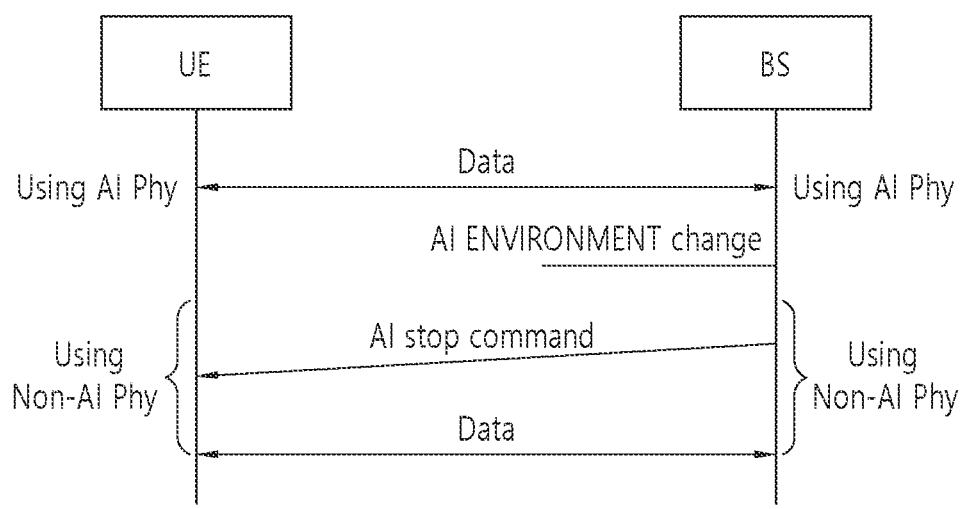
FIG. 17 is an exemplary view showing a method according to a fifth disclosure of the present specification.

FIG. 17 is an exemplary view showing a method according to a fifth disclosure of the present specification.

Referring to FIG. 17, after the UE and the BS apply AI parameters to encoding or decoding required for data transmission and reception, the BS may detect that the AI environment has changed. The change in the AI environment may include the cases of FIGS. 18 and 19 to be described later.

The BS may transmit an AI stop command to the UE. Then, the UE and the BS may stop applying AI to encoding or decoding and transmit and receive data.

Figure 18:
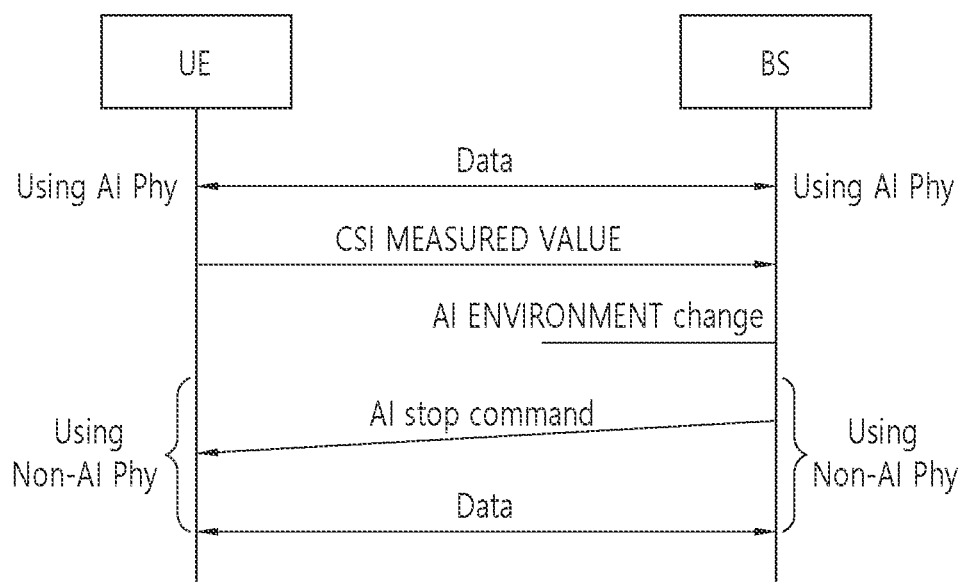
FIG. 18 is an exemplary view showing a method according to a sixth disclosure of the present specification.

FIG. 18 is an exemplary view showing a method according to a sixth disclosure of the present specification.

Referring to FIG. 18, after the UE and the BS apply the AI parameters to encoding or decoding required for data transmission and reception, the UE may measure channel status information (CSI) and transmit a measured value to the BS. The CSI refers to a communication connection state from a transmitting source to a receiving source. It is important to recognize changes in AI learning results because the AI learning results may vary depending on a channel situation. To this end, the channel situation may be recognized by adding information on channel delay characteristics (delay spread) in addition to the existing CSI information (SNR, PMI, and rank.

Upon receiving the CSI measurement value, the BS may determine that it is not appropriate to transmit and receive data using the existing AI parameter due to the change in a communication channel state of the UE and the BS due to the change in the AI environment. The BS may transmit an AI stop command to the UE. Then, the UE and the BS may stop applying AI to encoding for transmitting data or decoding for receiving data.

Figure 19:
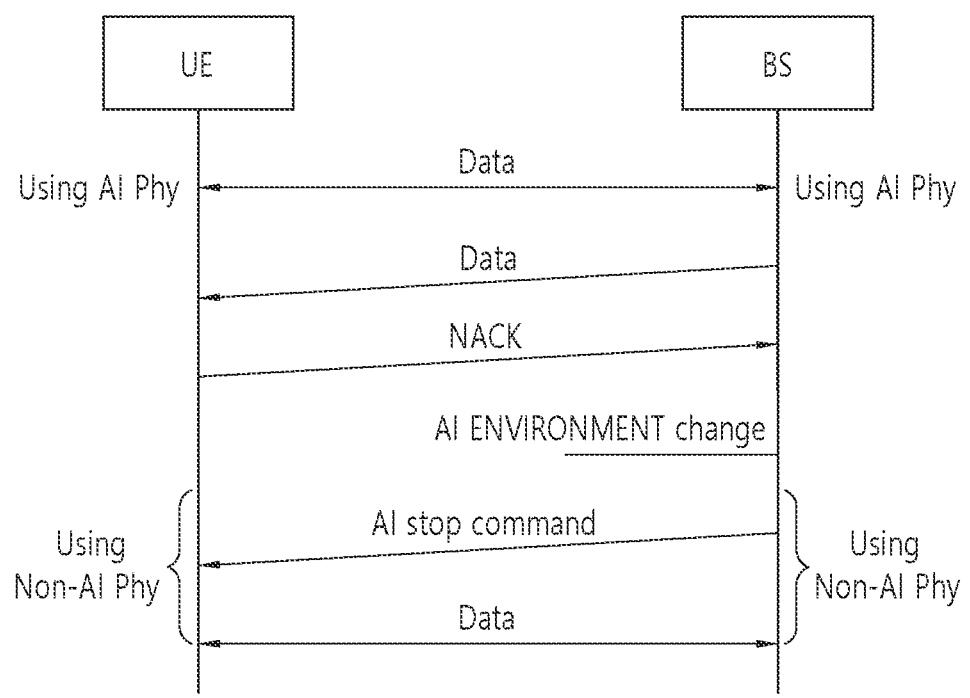
FIG. 19 is an exemplary view showing a method according to a seventh disclosure of the present specification.

FIG. 19 is an exemplary view showing a method according to a seventh disclosure of the present specification.

First, the BS transmits scheduling information through a physical downlink control channel (PDCCH) to transmit data to the UE according to an HARQ scheme.

The UE checks scheduling information transmitted thereto by monitoring the control channel, i.e., the PDCCH.

If it is determined that there is information on the UE according to the checking of the scheduling information, the UE receives data from the BS through a physical shared channel (PSCH) at a time associated with the PDCCH.

Referring to FIG. 19, after the UE and the BS apply AI parameters to encoding or decoding required for data transmission and reception, the UE may perform decoding on the data received from the BS using the AI parameters. The UE may transmit a hybrid automatic repeat request (HARQ) acknowledgment (ACK) signal if decoding is successful and a negative-acknowledgement (NACK) signal to BS if decoding fails.

Upon receiving the HARQ ACK signal, the BS may detect that the data transmission to the UE was successful, and transmit next data.

However, when the BS receives the HARQ NACK signal repeatedly, the BS may detect that data transmission to the UE has failed. That is, upon receiving the CSI measurement value, the BS may determine that it is not appropriate to transmit and receive data using the existing AI parameters due to a change in a communication channel state of the UE and the BS due to a change in the AI environment. The BS may send an AI stop command to the UE. Then, the UE and the BS may stop applying AI to encoding for transmitting data or decoding for receiving data.

Also, the BS may transmit data that has failed for decoding again to the UE. Then, the UE may receive the data and perform encoding without applying AI.

Figure 20:
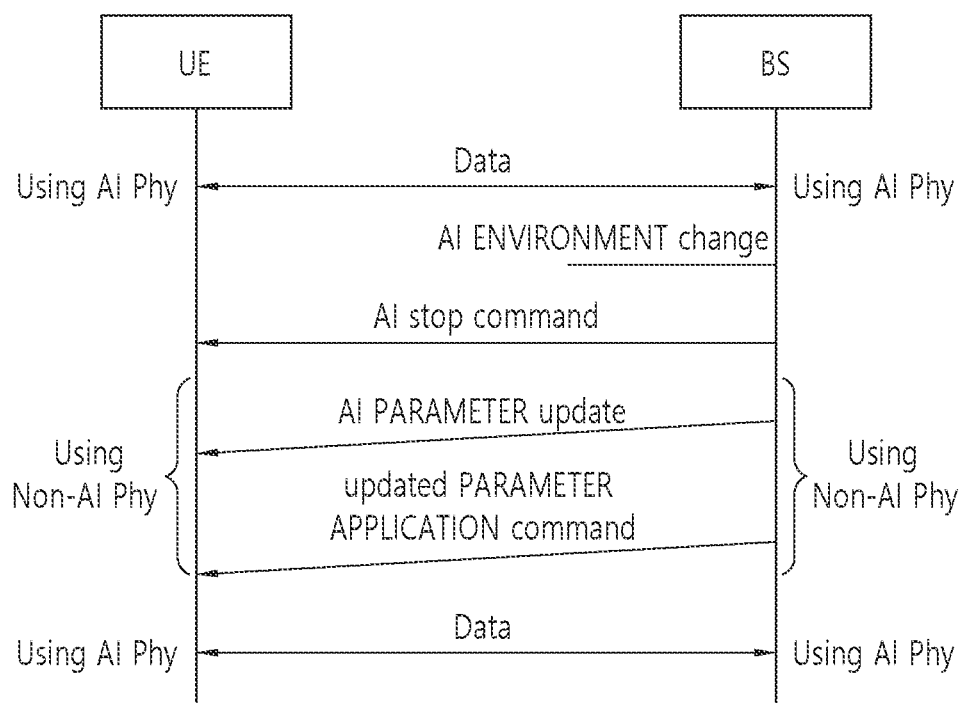
FIG. 20 is an exemplary view showing a method according to an eighth disclosure of the present specification.

FIG. 20 is an exemplary view showing a method according to an eighth disclosure of the present specification.

Referring to FIG. 20, after the UE and the BS apply the AI parameters to encoding or decoding required for data transmission and reception, the BS may detect the change of the AI environment and then the UE and the BS may stop applying the AI parameters to encoding for data transmission or decoding for data reception as described in FIGS. 17, 18, and 19.

The BS may have a plurality of AI parameter sets that may be selectively used according to an application environment.

If there is not difficulty in transmitting and receiving data although AI is applied to encoding or decoding by applying a new AI parameter, the BS may transmit, to the UE, at least one new AI parameter to be used when applying AI to the encoding or decoding process among the plurality of AI parameter sets. The AI parameters may include a plurality of information such as the number of layers, the number of nodes, a connection method, and a network type, which are AI calculation capability values.

The BS may transmit a signal instructing application of the updated new AI parameters. The UE and the BS may apply AI to encoding or decoding using the new AI parameters.

Then, the UE and the BS may transmit and receive data by applying AI to encoding or decoding again.

<General Example to which Disclosure of Present Specification May be Applied>

Hereinafter, a device to which the disclosure of the present specification as described above may be applied will be described.

Figure 21:
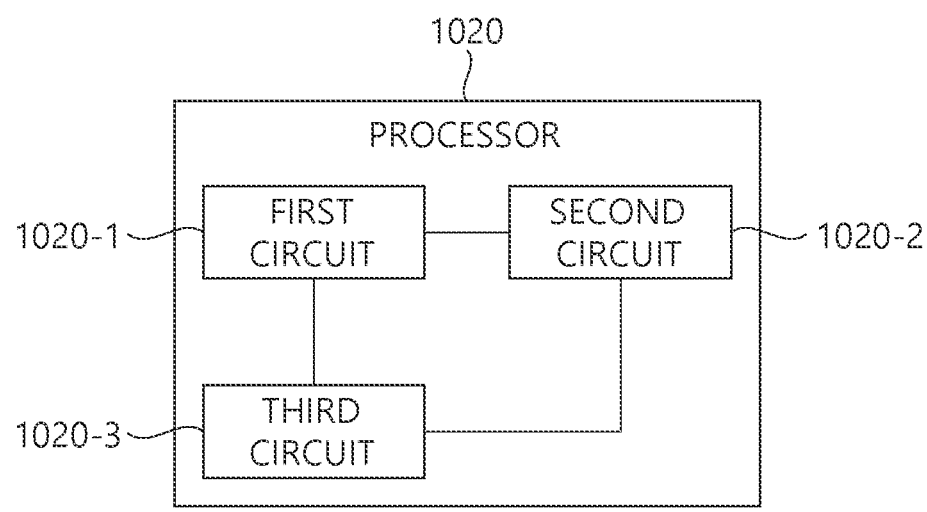
FIG. 21 shows a configuration block diagram of a processor in which the disclosure of the present specification is implemented.

FIG. 21 shows a block diagram of a processor in which the disclosure of the present specification is implemented.

As can be seen with reference to FIG. 18, a processor 1020 in which the disclosure of the present specification is implemented may include a plurality of circuitries to implement the proposed functions, procedures and/or methods described herein. For example, the processor 1020 may include a first circuit 1020-1, a second circuit 1020-2, and a third circuit 1020-3. Also, although not shown, the processor 1020 may include more circuits. Each circuit may include a plurality of transistors.

The processor 1020 may be referred to as an application-specific integrated circuit (ASIC) or an application processor (AP) and may include at least one of a digital signal processor (DSP), a central processing unit (CPU), and a graphics processing unit (GPU).

Figure 22:
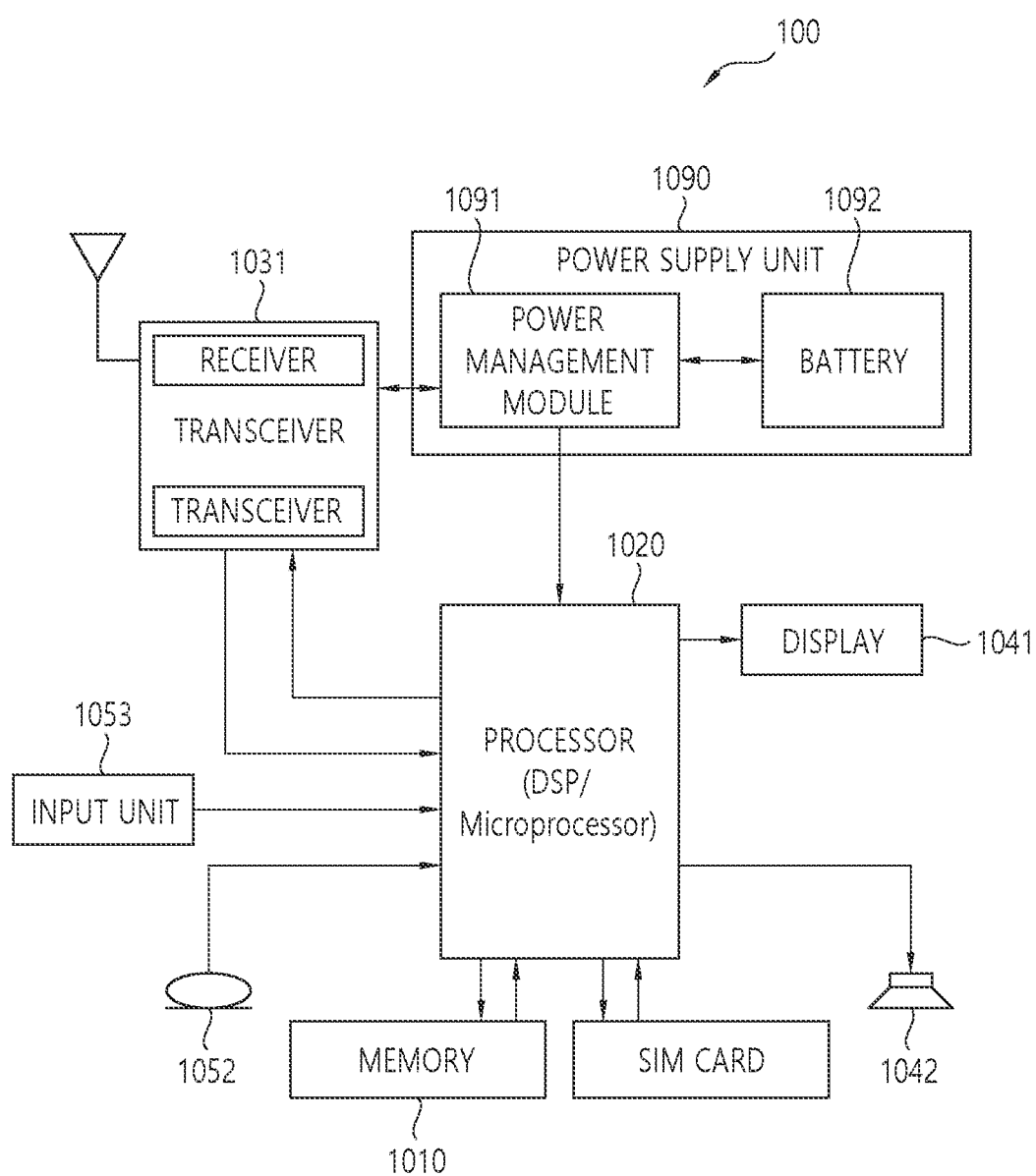
FIG. 22 is a block diagram showing a configuration of a user equipment (UE) according to an embodiment.

FIG. 22 is a block diagram showing a configuration of a user equipment (UE) according to an embodiment.

In particular, FIG. 22 is a diagram specifically illustrating the UE of FIG. 21 above.

The UE includes a memory 1010, a processor 1020, a transceiver 1031, a power management module 1091, a battery 1092, a display 1041, an input unit 1053, a speaker 1042, and a microphone 1052, a subscriber identification module (SIM) card, and one or more antennas.

The processor 1020 may be configured to implement the proposed functions, procedures, and/or methods described herein. Layers of a radio interface protocol may be implemented in the processor 1020. The processor 1020 may include an application-specific integrated circuit (ASIC), other chipsets, logic circuits, and/or data processing devices. The processor 1020 may be an application processor (AP). The processor 1020 may include at least one of a digital signal processor (DSP), a central processing unit (CPU), a graphics processing unit (GPU), and a modem (modulator and demodulator). Examples of the processor 1020 may be SNAPDRAGON™ series processors manufactured by Qualcomm®, EXYNOS™ series processors manufactured by Samsung®, A series processors manufactured by Apple®, HELIO™ series processors manufactured by MediaTek®, and ATOM™ series processors manufactured by INTEL or corresponding next-generation processors.

The power management module 1091 manages power for the processor 1020 and/or the transceiver 1031. The battery 1092 supplies power to the power management module 1091. The display 1041 outputs results processed by the processor 1020. The input unit 1053 receives input to be used by the processor 1020. The input unit 1053 may be displayed on the display 1041. The SIM card is an integrated circuit used to securely store an international mobile subscriber identity (IMSI) used to identify and authenticate subscribers in mobile phone devices such as mobile phones and computers and keys related thereto. Contact information may be stored in many SIM cards.

The memory 1010 is operatively coupled with the processor 1020 and stores various information for operating the processor 610. The memory 1010 may include a read-only memory (ROM), a random access memory (RAM), a flash memory, a memory card, a storage medium, and/or other storage devices. When the embodiment is implemented in software, the techniques described herein may be implemented as modules (e.g., procedures, functions, etc.) that perform the functions described herein. The modules may be stored in the memory 1010 and executed by the processor 1020. The memory 1010 may be implemented inside the processor 1020. Alternatively, the memory 1010 may be implemented outside the processor 1020 and may be communicatively connected to the processor 1020 through various means known in the art.

The transceiver 1031 is operatively coupled with the processor 1020 and transmits and/or receives wireless signals. The transceiver 1031 includes a transmitter and a receiver. The transceiver 1031 may include baseband circuitry for processing radio frequency signals. A transmitting and receiving part controls one or more antennas to transmit and/or receive wireless signals. The processor 1020 delivers command information to the transceiver 1031 to transmit, e.g., a wireless signal configuring voice communication data. The antenna functions to transmit and receive wireless signals. When receiving a wireless signal, the transceiver 1031 may deliver the signal and convert the signal to a baseband signal to be processed by the processor 1020. The processed signal may be converted into audible or readable information output through the speaker 1042.

The speaker 1042 outputs sound-related results processed by the processor 1020. The microphone 1052 receives sound-related inputs to be used by the processor 1020.

The user inputs command information such as a phone number by, e.g., pressing (or touching) a button of the input unit 1053 or by voice activation using the microphone 1052. The processor 1020 receives such command information and processes the received command information to perform an appropriate function such as dialing a telephone number. Operational data may be extracted from the SIM card or the memory 1010. In addition, the processor 1020 may display the command information or operation information on the display 1041 for user recognition or user convenience.

According to the disclosure of the present specification, the problems of the related art described above are solved.

What is claimed is:

1. A method for transmitting or receiving data, by a user equipment (UE), to or from a base station (BS), the method comprising:
   transmitting, by the UE, capability information of the UE to the BS, wherein the capability information includes information related to artificial intelligence (AI) calculation for the data transmission or reception;
   receiving, by the UE, at least one of a plurality of AI parameters from the BS;
   applying the at least one AI parameter to an encoding process for the data transmission or a decoding process for the data reception,
   wherein the encoding process or the decoding process is performed by information on a network structure in the at least one AI parameter,
   wherein the at least one AI parameter comprises a plurality of information for performing the encoding process or the decoding process by the network structure;
   receiving a data from the BS;
   performing measurement of i) a first quality value in applying the AI parameter to the data and ii) a second quality value in not applying the AI parameter to the data;
   calculating a difference between the first quality value and the second quality value;
   transmitting a request for stopping of the AI application to the BS, based on the difference exceeding a predetermined offset value; and
   stopping applying of the AI parameter to the encoding process or the decoding process.

2. The method of claim 1, wherein the UE receives system information including AI information of the BS from the BS.

3. The method of claim 1, further comprising:
   transmitting, by the UE, an AI application request to the BS,
   wherein the applying the at least one AI parameter is performed after the AI application request is transmitted.

4. The method of claim 1, further comprising:
   receiving an AI application command from the BS,
   wherein the applying the at least one AI parameter is performed after the AI application command is received.

5. The method of claim 1, further comprising:
   transmitting, by the UE, a signal for requesting a new AI parameter to the BS;
   receiving, by the UE, the new AI parameter from the BS; and
   applying the new AI parameter to the encoding process or the decoding process.

6. The method of claim 1, further comprising:
   receiving, by the UE, a command for stopping AI application from the BS after the AI parameter is applied; and
   stopping applying of the AI parameter to the encoding process or the decoding process.

7. The method of claim 6, further comprising:
   measuring, by the UE, a channel status information (CSI) including a channel delay characteristic and transmitting the CSI measurement value to the BS, after the AI parameter is applied,
   wherein the UE receiving of the command for stopping AI application from the BS is performed after the CSI measurement value is transmitted to the BS.

8. The method of claim 6, further comprising:
   receiving data from the BS; and
   transmitting a hybrid automatic repeat request (HARQ) acknowledgement (ACK) or negative-acknowledgement (NACK) signal based on the data received from the BS,
   wherein the AI application stop command is received in response to transmission of the HARQ NACK signal.

9. The method of claim 6, further comprising:
   receiving, by the UE, a new AI parameter from the BS;
   receiving, by the UE, a command for applying the new AI parameter from the B S; and
   applying the new AI parameter to the encoding process or the decoding process.

10. A user equipment (UE) comprising:
    at least one processor; and
    at least one memory configured to store instructions and be operably electrically connected to the at least one processor,
    wherein operations performed based on the instructions executed by the at least one processor comprise:
    transmitting, by the UE, capability information to the BS, wherein the capability information includes information related to artificial intelligence (AI) calculation for the data transmission or reception;

receiving, by the UE, at least one of a plurality of AI parameters from the BS;

applying the at least one AI parameter to an encoding process for the data transmission or a decoding process for the data reception, wherein the encoding process or the decoding process is performed by information on a network structure in the at least one AI parameter, wherein the at least one AI parameter comprises a plurality of information for performing the encoding process or the decoding process by the network structure;

receiving a data from the BS;

performing measurement of i) a first quality value in applying the AI parameter to the data and ii) a second quality value in not applying the AI parameter to the data;

calculating a difference between the first quality value and the second quality value;

transmitting a request for stopping of the AI application to the BS, based on the difference exceeding a predetermined offset value; and stopping applying of the AI parameter to the encoding process or the decoding process.

* * * * *